(12) United States Patent
Mathieu

(10) Patent No.: US 8,488,044 B2
(45) Date of Patent: Jul. 16, 2013

(54) SINGLE-LENS EXTENDED DEPTH-OF-FIELD IMAGING SYSTEMS

(75) Inventor: Gilles Mathieu, Ma On Shon (HK)

(73) Assignee: Global Bionic Optics Pty Ltd., Chatswood, New South Wales (AU)

( * ) Notice: Subject to any disclaimer, the term of this patent is extended or adjusted under 35 U.S.C. 154(b) by 234 days.

(21) Appl. No.: 12/735,872

(22) PCT Filed: Feb. 17, 2009

(86) PCT No.: PCT/IB2009/005383
§ 371 (c)(1),
(2), (4) Date: Aug. 23, 2010

(87) PCT Pub. No.: WO2009/106996
PCT Pub. Date: Sep. 3, 2009

(65) Prior Publication Data
US 2010/0328517 A1 Dec. 30, 2010

(30) Foreign Application Priority Data
Dec. 12, 2008 (EP) .................................. 08305927

(51) Int. Cl.
*H04N 5/225* (2006.01)
(52) U.S. Cl.
USPC ............................. 348/335; 348/360; 359/676
(58) Field of Classification Search
USPC ............................. 348/335, 360, 361; 359/676
See application file for complete search history.

(56) References Cited

U.S. PATENT DOCUMENTS

| | | | |
|---|---|---|---|
| 4,124,276 A | 11/1978 | Okano | |
| 4,898,461 A | 2/1990 | Portney | |
| 5,748,371 A | 5/1998 | Cathey et al. | |
| 6,927,922 B2 | 8/2005 | George et al. | |
| 6,940,649 B2 | 9/2005 | Dowsky | |
| 7,061,693 B2 | 6/2006 | Zalevsky | |
| 7,158,317 B2 | 1/2007 | Ben-Eliezer et al. | |
| 7,209,293 B2 | 4/2007 | Gaida et al. | |
| 7,215,493 B2 | 5/2007 | Olmstead et al. | |
| 7,218,448 B1 | 5/2007 | Cathey et al. | |

(Continued)

FOREIGN PATENT DOCUMENTS
EP 1 978 394 A1 10/2008

OTHER PUBLICATIONS

Liu et al., "Cemented doublet lens with an extended focal depth," Optics Express, vol. 13, No. 2, Jan. 24, 2005 (pp. 552-557).
Mouroulis P., "Depth of field extension with spherical optics," Optics Express vol. 16, No. 17, Aug. 18, 2008.

*Primary Examiner* — Tuan Ho
(74) *Attorney, Agent, or Firm* — Downs Rachlin Martin PLLC; Joseph E. Gortych, Esq.

(57) ABSTRACT

An extended depth of field (EDOF) imaging system that has a corresponding extended depth of focus (EDOF'). The imaging system has an optical system consisting of a single lens element and an objectwise aperture stop arrange substantially at a zero-coma axial position. The single lens element is configured so that the optical system has a select amount of spherical aberration (SA) in the range $0.2\lambda \leqq SA \leqq 2\lambda$, where $\lambda$ is an imaging wavelength. The single lens element generates an amount of axial chromatic aberration that increases the EDOF while decreasing the average MTF of the optical system relative to the optical system having no chromatic aberration. The imaging system has an image sensor for forming a digitized raw image of an object.

19 Claims, 20 Drawing Sheets

U.S. PATENT DOCUMENTS

| | | |
|---|---|---|
| 7,224,540 B2 | 5/2007 | Olmstead et al. |
| 7,260,251 B2 | 8/2007 | Dowsky |
| 7,336,430 B2 | 2/2008 | George et al. |
| 7,469,202 B2 | 12/2008 | Dowsky et al. |
| 8,014,084 B2 * | 9/2011 | Alon et al. .................... 359/785 |
| 2006/0050409 A1 | 3/2006 | George et al. |
| 2007/0236573 A1 | 10/2007 | Alon |
| 2007/0247725 A1 | 10/2007 | Dowsky |
| 2008/0151391 A1 | 6/2008 | Zalevsky |
| 2011/0115965 A1 * | 5/2011 | Engelhardt et al. ........... 348/345 |

* cited by examiner

SINGLE-LENS EXTENDED DEPTH-OF-FIELD IMAGING SYSTEMS

CLAIM OF PRIORITY

This application claims the benefit of priority of PCT Patent Application Serial Number PCT/IB2008/001304, filed on Feb. 29, 2008, and which is incorporated by reference herein, and European Patent Application Serial No. EP08305927, filed on Dec. 12, 2008, and which is incorporated by reference herein, and also claims the benefit of priority under 35 U.S.C. §365 of International Patent Application Serial No. PCT/IB2009/005383, filed on Feb. 27, 2009, designating the United States of America, which patent application is incorporated by reference herein.

BACKGROUND ART

1. Field of the Invention

The present invention relates generally to extended depth-of-field imaging systems, and particularly relates to such a system that utilizes a single lens element in the imaging optical system.

2. Technical Background

Extended depth-of-field ("EDOF") imaging systems (also referred to as "extended depth-of-focus" imaging systems) have seen increased use in various applications such as biometrics (e.g., iris recognition), bar-code scanners and closed-circuit television (CCTV) systems.

The optical systems of EDOF imaging systems typically include either more than one lens element or include a non-circularly symmetric "wavefront coding" plate arranged in the entrance pupil to impart a complex wavefront shape.

Since EDOF imaging systems are desirable for use in an increasingly greater number of imaging applications that call for small form factors (e.g., cell phones and other hand-held image-capturing devices), there is a need for EDOF imaging systems that are extremely simple and compact but that can still provide EDOF imaging capability.

SUMMARY OF THE INVENTION

The present invention is directed to an extended depth-of-focus (EDOF) imaging system that has an optical system consisting of only one lens element and an aperture stop located objectwise of the lens element. The lens element is configured so that the optical system has substantially constant spherical aberration over the entire image field while having substantially no coma or astigmatism, and perhaps some chromatic aberration, depending on the spectral bandwidth used to form the image. The single-lens configuration makes for a very compact and simple EDOF imaging system useful for a wide range of imaging applications.

Accordingly, a first aspect of the invention is an imaging system for imaging an object within an EDOF and at an imaging wavelength $\lambda$. The system includes an optical system having an optical axis and consisting of a single lens element and an aperture stop arranged objectwise of the single lens element. The optical system has an amount of spherical aberration SA wherein $0.2\lambda \leq SA \leq 2\lambda$ when forming an image of the object. The single lens element is made of a material that generates an amount of axial chromatic aberration that increases the EDOF up to 20% while decreasing the average MTF level of the optical system by no more than 25%, relative to the optical system having no chromatic aberration. The imaging system also includes an image sensor arranged to receive the image and form therefrom a digitized electronic raw image.

A second aspect of the invention is the above-described imaging system that further includes an image processor electrically connected to the image sensor and adapted to receive and process the digitized electronic raw image using digital filtering to form a digitized contrast-enhanced image.

A third aspect of the invention is a method of forming an image of an object over an EDOF and at an imaging wavelength $\lambda$. The method includes forming a raw image of an object with an optical system that consists of a single lens element and an aperture stop arranged objectwise of the single lens element. The optical system has an amount of spherical aberration SA such that $0.2\lambda \leq SA \leq 2\lambda$. The single lens element is made of a material, and the method includes selecting the material so that the single lens generates an amount of axial chromatic aberration that increases the EDOF up to 20% while decreasing the average MTF level of the optical system by no more than 25%, relative to the optical system having no chromatic aberration. The method further includes using an image sensor to electronically capturing the raw image to form a digitized raw image. In one example embodiment, this digitized raw image is used directly for the given application. In another example embodiment, the method further includes digitally filtering the digitized raw image to form a contrast-enhanced image.

A fourth aspect of the invention is an EDOF imaging system for forming a contrast-enhanced image of an object at an imaging wavelength $\lambda$. The imaging system includes an optical system consisting of a single lens element and an objectwise aperture stop, wherein the optical system has an amount of spherical aberration SA wherein $0.5\lambda \leq SA \leq 2\lambda$, and wherein the optical system forms a raw image. The system further includes an image sensor arranged to receive the raw image and form a raw image electrical signal, wherein the raw image has an associated raw modulation transfer function (MTF). The imaging system also includes an image processor electrically connected to the image sensor. The image processor is adapted to receive the raw image electrical signal and perform image processing thereon to form the contrast-enhanced image using an enhanced MTF formed from the raw MTF using a rotationally symmetric gain function.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE INVENTION

Figure 1:
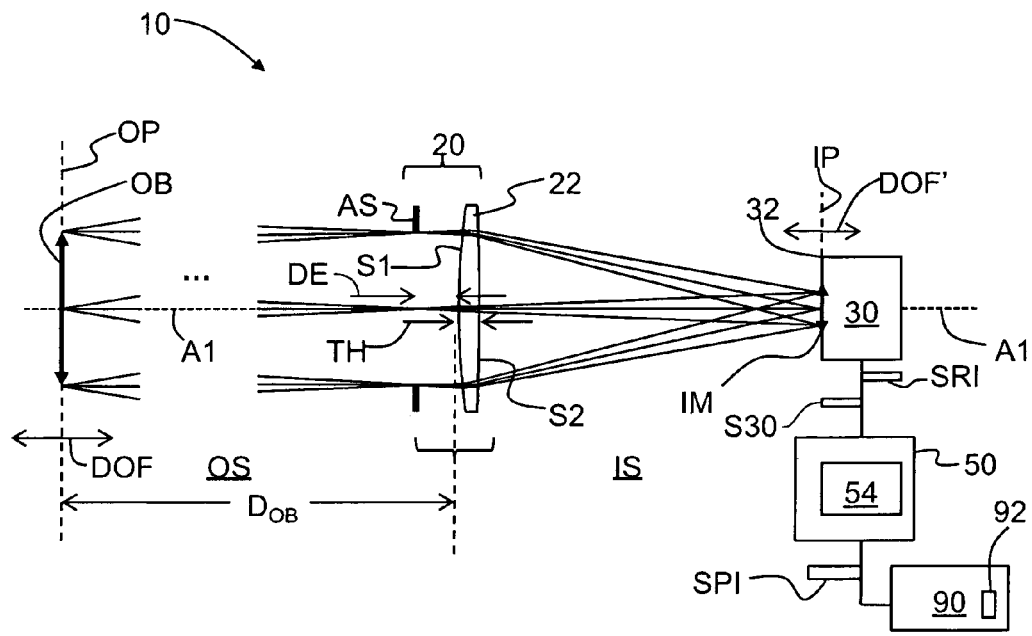
FIG. 1 is a schematic diagram of an example embodiment of a single-lens EDOF imaging system according to the present invention.

Reference is now made in detail to the present preferred embodiments of the invention, examples of which are illustrated in the accompanying drawings. Whenever possible, like or similar reference numerals are used throughout the drawings to refer to like or similar parts. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

The present invention is directed to single-lens EDOF imaging systems that cover a wide range of focal lengths. Potential applications include compact imaging systems such as mobile image capture devices (e.g., cell phone cameras), iris recognition systems, facial image capture for facial recognition systems, and CCTV systems.

The term "lens element" as used herein is defined as a single, rotationally symmetric optical component, and does not include so-called "phase plates" or "phase-encoding" elements that typically reside in the entrance pupil of an optical system and that are not rotationally symmetric.

The phrase "extended depth-of-field" as used herein means a depth-of-field that is larger than what is normally associated with the corresponding diffraction-limited optical system. The phrase "extended depth-of-focus" is similarly defined.

The phrase "contrast-enhanced image" means an image having improved contrast as compared to the contrast of an initial or "raw" image formed by the optical system.

Unless otherwise noted, the values of F/# and numerical aperture (NA) are for the image space.

A generalized single-lens EDOF optical imaging system is first discussed, followed by example embodiments of single-lens imaging optical systems for use in the generalized EDOF imaging system.

Generalized EDOF System

FIG. 1 is a schematic diagram of a generalized embodiment of a generalized single-lens EDOF optical system ("system") 10 according to the present invention. System 10 includes an optical axis A1 along which is arranged an imaging optical system 20 that consists of a single lens element 22 and an aperture stop AS located objectwise of the lens element. Aperture stop AS is "clear" or "open," meaning that it does not include any phase-altering elements, such as phase plates, phase-encoding optical elements or other types of phase-altering means.

Optical system 20 has a lateral magnification $M_L$, an axial magnification $M_A = (M_L)^2$, an object plane OP in an object space OS and an image plane IP in an image space IS. An object OB is shown in object plane OP and the corresponding image IM formed by optical system 20 is shown in image plane IP. Object OB is at an axial object distance $D_{OB}$ from lens element 22.

Optical system 20 has a depth of field DOF in object space OS over which the object can be imaged and remain in focus. Likewise, optical system 20 has a corresponding depth of focus DOF' in image space IS over which image IM of object OB remains in focus. Object and image planes OS and IS are thus idealizations of the respective positions of object OB and the corresponding image IM and typically correspond to an optimum object position and a "best focus" position, respectively. In actuality, these planes can actually fall anywhere within their respective depth of field DOF and depth of focus DOF', and are typically curved rather than planar. The depth of field DOF and depth of focus DOF' are defined by the properties of optical system 20, and their interrelationship and importance in system 10 is discussed more fully below.

System 10 also includes an image sensor 30 that has a photosensitive surface 32 (e.g., an array of charge-coupled devices) arranged at image plane IP so as receive and detect image IM, which is also referred to herein as an "initial" or a "raw" image. In an example embodiment, image sensor 30 is or otherwise includes a high-definition CCD camera or CMOS camera. In an example embodiment, photosensitive surface 32 is made up of 3000×2208 pixels, with a pixel size of 3.5 microns. The full-well capacity is reduced to 21,000 electrons for a CMOS camera at this small pixel size, which translates into a minimum of shot noise of 43.2 dB at saturation level. An example image sensor 30 is or includes a camera from Pixelink PL-A781 having 3000×2208 pixels linked by IEEE1394 Fire Wire to an image processor (discussed below), and the application calls API provided by a Pixelink library in a DLL to control the camera perform image acquisition.

In an example embodiment, system 10 further includes a controller 50, such as a computer or like machine, that is adapted (e.g., via instructions such as software embodied in a computer-readable or machine-readable medium) to control the operation of the various components of the system. Controller 50 is configured to control the operation of system 10 and includes an image processing unit ("image processor") 54 electrically connected to image sensor 30 and adapted to receive and process digitized raw image signals SRI therefrom and form processed image signals SPI, as described in greater detail below.

Figure 2:
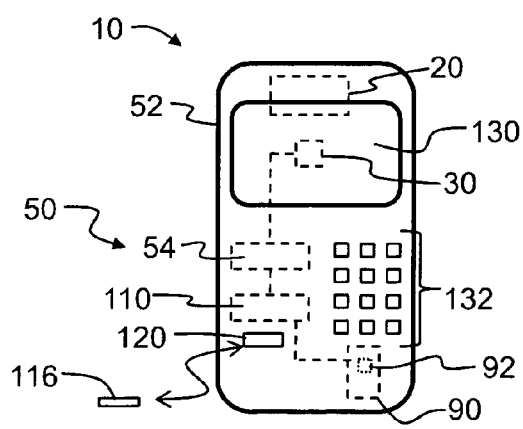
FIG. 2 is a schematic diagram of an example hand-held device that includes the EDOF imaging system of FIG. 1, and illustrates an example controller.

FIG. 2 is a schematic diagram of an example hand-held device 52 that includes system 10, and illustrates an example controller 50. In an example embodiment, controller 50 is or includes a computer with a processor (e.g., image processor 54) and includes an operating system such as Microsoft WINDOWS or LINUX.

In an example embodiment, image processor 54 is or includes any processor or device capable of executing a series of software instructions and includes, without limitation, a general- or special-purpose microprocessor, finite state machine, controller, computer, central-processing unit (CPU), field-programmable gate array (FPGA), or digital signal processor. In an example embodiment, the processor is an Intel XEON or PENTIUM processor, or an AMD TURION or other processor in the line of such processors made by AMD Corp., Intel Corp. or other semiconductor processor manufacturer.

Controller 50 also preferably includes a memory unit ("memory") 110 operably coupled to image processor 54. As used herein, the term "memory" refers to any processor-readable medium, including but not limited to RAM, ROM, EPROM, PROM, EEPROM, disk, floppy disk, hard disk, CD-ROM, DVD, or the like, on which may be stored a series of instructions executable by image processor 54. In an example embodiment, controller 50 includes a port or drive 120 adapted to accommodate a removable processor-readable medium 116, such as CD-ROM, DVE, memory stick or like storage medium.

The EDOF methods of the present invention may be implemented in various embodiments in a machine-readable medium (e.g., memory 110) comprising machine readable instructions (e.g., computer programs and/or software modules) for causing controller 50 to perform the methods and the controlling operations for operating system 10. In an example embodiment, the computer programs run on image processor 54 out of memory 110, and may be transferred to main memory from permanent storage via disk drive or port 120 when stored on removable media 116, or via a network connection or modem connection when stored outside of controller 50, or via other types of computer or machine-readable media from which it can be read and utilized.

The computer programs and/or software modules may comprise multiple modules or objects to perform the various methods of the present invention, and control the operation and function of the various components in system 10. The type of computer programming languages used for the code may vary between procedural code-type languages to object-oriented languages. The files or objects need not have a one to one correspondence to the modules or method steps described depending on the desires of the programmer. Further, the method and apparatus may comprise combinations of software, hardware and firmware. Firmware can be downloaded into image processor 54 for implementing the various example embodiments of the invention.

Controller 50 also optionally includes a display 130 that can be used to display information using a wide variety of alphanumeric and graphical representations. For example, display 130 is useful for displaying enhanced images. Controller 50 also optionally includes a data-entry device 132, such as a keyboard, that allows a user of system 10 to input information into controller 50 (e.g., the name of the object being imaged, and to manually control the operation of system 10. In an example embodiment, controller 50 is made sufficiently compact to fit within a small form-factor housing of a hand-held or portable device, such as device 52 shown in FIG. 2.

System 10 also optionally includes a database unit 90 operably connected to controller 50. Database unit 90 includes a memory unit 92 that serves as a computer-readable medium adapted to receive processed image signals SPI from image processor 54 and store the associated processed digital images of object OB as represented by the processed image signals. Memory unit ("memory") 92 may be any computer-readable medium, including but not limited to RAM, ROM, EPROM, PROM, EEPROM, disk, floppy disk, hard disk, CD-ROM, DVD, or the like, on which data may be stored. In an example embodiment; database unit 90 is included within controller 50.

General Method of Operation

With reference to FIG. 1, in the general operation of system 10, image IM of object OB is formed on photosensitive surface 32 of sensor 30 by optical system 20. Controller 50 sends a control signal S30 to activate image sensor 30 for a given exposure time so that image IM is captured by photosensitive surface 32. Image sensor 30 digitizes this "raw" image IM and creates the electronic raw image signal SRI representative of the raw captured image.

At this point, in one example embodiment, the raw image IM can be used directly, i.e., without any image processing, or with only minor image processing that does not involve MTF-enhancement, as discussed below. This approach can be used for certain types of imaging applications, such as character recognition and for imaging binary objects (e.g., bar-code objects) where, for example, determining edge location is more important than image contrast. The raw image IM is associated with an EDOF provided by optical system 20 even without additional contrast-enhancing image processing, so that in some example embodiments, system 10 need not utilize the image-processing portion of the system. In an example embodiment, a number N of raw images are collected and averaged (e.g., using image processor 54) in order to form a (digitized) raw image IM' that has reduced noise as compared to any one of the N raw images.

In other example embodiments where the raw image IM is not directly usable, image processor 54 receives and digitally processes the electronic raw image signal SRI to form a corresponding contrast-enhanced image embodied in an electronic processed image signal SPI, which is optionally stored in database unit 90. For example, when system 10 is used for iris recognition, controller 50 accesses the stored processed images in database unit 90 and compares them to other stored iris images or to recently obtained processed iris images to perform personnel identification.

Image Processing

Image processor 54 is adapted to receive from image sensor 30 digitized electrical raw image signals SRI and process the corresponding raw images to form processed, contrast-enhanced images. This is accomplished by filtering the raw images in a manner that restores the MTF as a smooth function that decreases continuously with spatial frequency and that preferably avoids overshoots, ringing and other image artifacts.

Noise amplification is often a problem in any filtering process that seeks to sharpen a signal (e.g., enhance contrast in a digital optical image). Accordingly, in an example embodiment, an optimized gain function (similar to Wiener's filter) that takes in account the power spectrum of noise is applied to reduce noise amplification during the contrast-enhancement process.

In an example embodiment, the gain function applied to the "raw" MTF to form the "output" or "enhanced" MTF depends on the object distance $D_{OB}$. The MTF versus distance $D_{OB}$ is acquired by a calibration process wherein the MTF is measured in the expected depth of field DOF by sampling using defocus steps $\delta_F \leq (\frac{1}{8})(\lambda/(NA^2))$ to avoid any undersampling and thus the loss of through-focus information for the MTF. In this instance, the enhanced MTF is said to be "focus-dependent."

Figure 3:
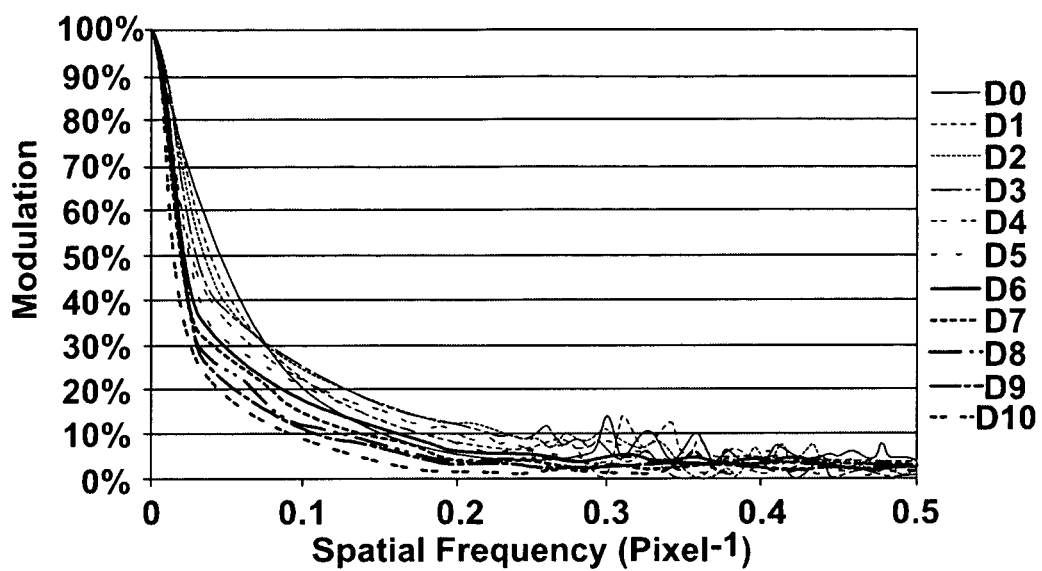
FIG. 3 is a plot of the measured (raw) MTF for various defocus positions for an example single-lens EDOF imaging system of FIG. 1.

FIG. 3 plots the measured or "raw" MTFs as measured at different defocus distances $\delta_F$ of 10 mm from best focus between extremes of −50 mm and +50 mm of defocus. The raw MTF plots for different focus distances illustrate the MTF dispersion that occurs due to defocus. For each step through defocus, a digital filtering function is used to restore the best MTF for the processed image according to the measured MTF. The use of this filter requires knowing the amount of defocus, which can be measured using any one of a number of available techniques known in the art. The filter used between defocus steps $\delta_F$ is the linear interpolation of the adjacent focus steps.

MTF Restoration

The above-mentioned MTF gain function used to restore or enhance the raw MTF is a three-dimensional function G(u, v, d), wherein u is the spatial frequency along the X axis, v is the spatial frequency along the Y axis, and d is the distance of the object in the allowed extended depth of field DOF (d thus corresponds to the object distance $D_{OB}$). The rotational symmetry of the PSF and MTF results in a simplified definition of the gain function, namely:

$$G'(w, d) \text{ with } w^2 = u^2 + v^2$$

The rotational symmetry also makes G'(w, d) a real function instead of a complex function in the general case.

The "enhanced" or "restored" OTF is denoted OTF' and is defined as:

$$OTF'(u, v, d) = G(u, v, d) \, OTF(u, v, d)$$

where OTF is the Optical Transfer Function of the optical system for incoherent light, OTF' is the equivalent OTF of the imaging system including the digital processing, and G is the aforementioned MTF gain function. The relationship for the restored or "output" or "enhanced" MTF (i.e., MTF) based on the original or unrestored MTF is given by:

$$MTF'(w, d) = G'(w, d) \, MTF(w, d)$$

Figure 4A:
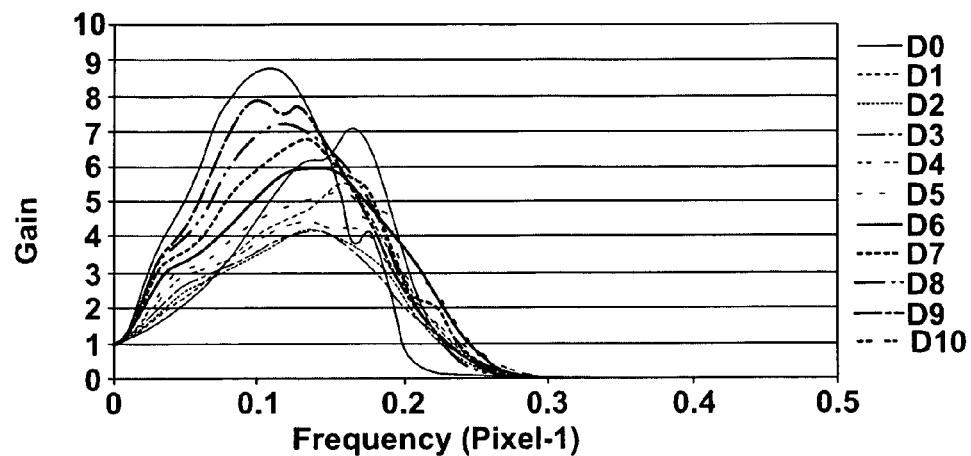
FIG. 4A plots through focus the typical gain in the output MTF' as compared to the raw MTF for various defocus positions D0 through D10.
Figure 4B:
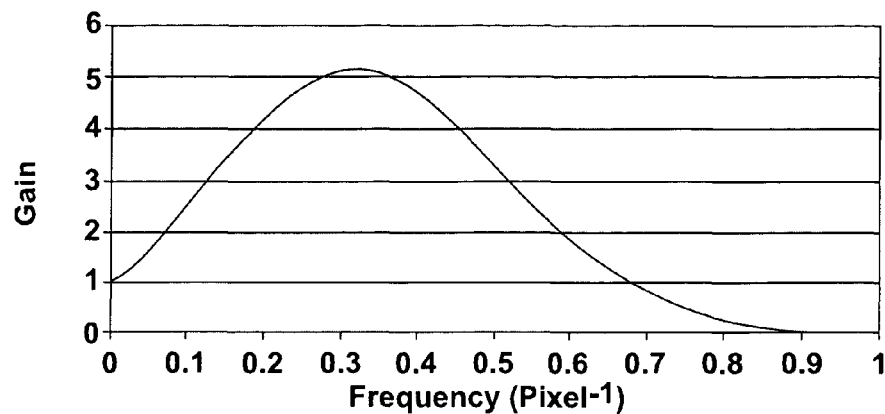
FIG. 4B plots through focus the typical gain in the output MTF' as compared to the raw MTF as obtained using a constant gain function process for various defocus positions when the object distance is unknown.
Figure 5B:
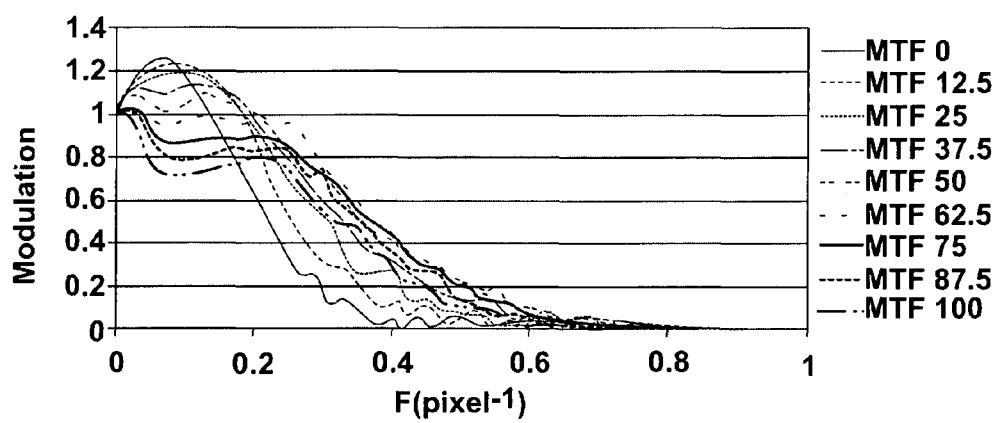
FIG. 5B plots the typical output (enhanced) MTF' for the different focus positions D0 through D10 based on the MTF gain of FIG. 4B.

When the object distance is unknown, an optimized average gain function G' can be used, as shown in FIG. 4B. The resulting MTF is enhanced, but is not a function of the object distance.

The after-digital process is preferably optimized to deliver substantially the same MTF at any distance in the range of the working depth of field DOF. This provides a substantially constant image quality, independent of object distance $D_{OB}$, so long as $D_{OB}$ is within the depth of field DOF of optical system 20. Because optical system 20 has an extended depth of field DOF due to the presence of spherical aberration as described below, system 10 can accommodate a relatively large variation in object distance $D_{OB}$ and still be able to capture suitable images.

Figure 5A:
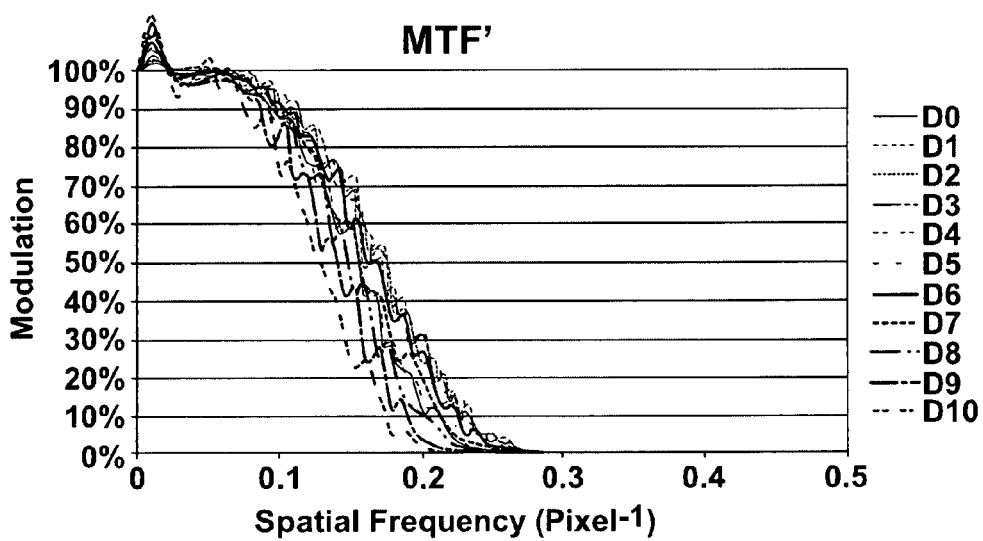
FIG. 5A plots the typical output (enhanced) MTF' for the different focus positions D0 through D10 based on the MTF gain of FIG. 4A.

FIG. 4A plots through focus the typical gain in the output MTF' obtained using the above-described process. FIG. 5A plots the typical output MTF' for the different focus positions.

The shape of the output MTF' is close as possible of the hypergaussian function, namely:

$$MTF'(\omega, d) = \exp\left(-\left(\frac{\omega}{\omega_c}\right)^{2n}\right)$$

wherein n is the hypergaussian order, w is the cutoff frequency, which is set at the highest frequency where the raw MTF is higher that 5% on the whole range of the extended depth of field DOF.

If n=1, the output MTF' is Gaussian. This provides a PSF, LSF (line-spread function) and ESF (edge-spread function) without any ringing or overshoot. If n>1, the output MTF' is a hypergaussian. For higher values of n, the contrast in high spatial frequencies is also high, but the occurrence of ringing and overshoot increases. A good compromise is n=2, wherein the output MTF' is well enhanced at low and medium spatial frequencies, while the ringing and overshoot are limited to about 3%, which is acceptable for most imaging applications.

The real output MTF' is as close as possible to a hypergaussian, and is determined by an optimization process that involves a merit function M, which is defined as:

$$M = A_0 \cdot \int_0^{Fc} \left(MTF'(\omega, d) - \exp\left(-\left(\frac{\omega}{\omega_c}\right)^{2n_1}\right)^2\right) d\omega + A_1 \cdot \int G'(\omega, d)^2 d\omega + A_2 \cdot \Delta os^2$$

Merit function M is minimized by using, for example, a Newton optimization algorithm. The first term with the coefficient $A_0$ minimizes the deviation from the hypergaussain output MTF'. The second term with the coefficient $A_1$ controls the power noise amplification. The third term with the coefficient $A_2$ controls the overshoot amplification.

Figure 6:
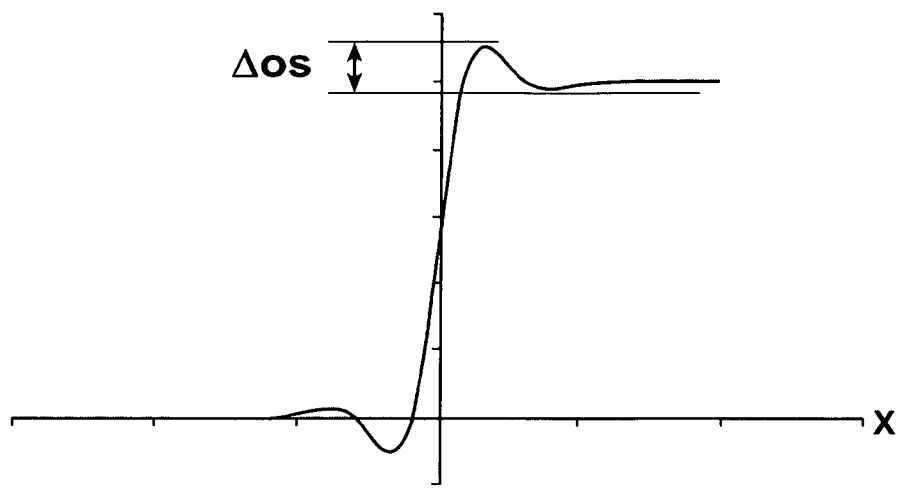
FIG. 6 is a plot of the intensity I versus position for the image of an edge, showing the overshoot $\Delta os$ caused by ringing in the image.

It is important to control the power noise amplification. At distances where the gain on the raw MTF is higher in order to achieve the output MTF', a good compromise between the MTF level and the signal-to-noise ratio on the image can be determined, while controlling the slope of the output MTF' at high special frequencies avoids significant overshoot. The third term in the merit function M is the square of the relative overshoot on an edge spread, which is illustrated in FIG. 6, wherein the overshoot is given by $\Delta os$.

Figure 7:
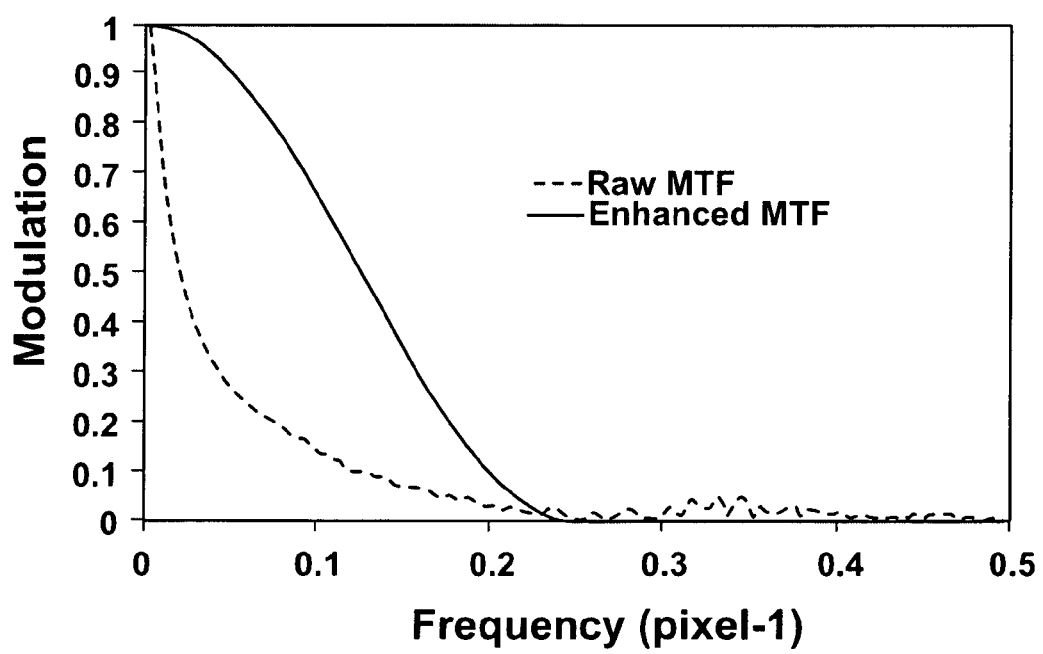
FIG. 7 plots the raw MTF and the output (enhanced) MTF at best focus to illustrate the recovery of image resolution (contrast) via image processing.

FIG. 7 is a plot of the raw MTF (dashed line) along with an output MTF' (solid line) formed using the process described above. The output MTF' has a smooth shape that avoids overshoots and other imaging artifacts. The applied gain of the digital filter is optimized or enhanced to obtain the maximum output MTF' while controlling the gain or noise.

In an example embodiment, the raw MTF is measured for calibration at different sampled distances that overlap the extended depth of field DOF by using a slanted edge with a uniform incoherent backlighting at the same spectrum used during image capture.

Image Noise Reduction by Averaging Sequential Images

There are two distinct sources of noise associated with the image acquisition and image processing steps. The first source of noise is called "fixed-pattern noise" or FP noise for short. The FP noise is reduced by a specific calibration of image sensor 30 at the given operating conditions. In an example embodiment, FP noise is reduced via a multi-level mapping of the fixed pattern noise wherein each pixel is corrected by a calibration table, e.g., a lookup table that has the correction values. This requires an individual calibration of each image sensor and calibration data storage in a calibration file. The mapping of the fixed pattern noise for a given image sensor is performed, for example, by imaging a pure white image (e.g., from an integrating sphere) and measuring the variation in the acquired raw digital image.

The other source of noise is shot noise, which is random noise. The shot noise is produced in electronic devices by the Poisson statistics associated with the movement of electrons. Shot noise also arises when converting photons to electrons via the photo-electric effect.

Some imaging applications, such as iris recognition, require a high-definition image sensor 30. To this end, in an example embodiment, image sensor 30 is or includes a CMOS or CCD camera having an array of 3000×2208 pixels with a pixel size of 3.5 µm. The full well capacity is reduced to 21,000 electrons for a CMOS camera at this small pixel size, and the associated minimum of shot noise is about 43.2 dB at the saturation level.

An example embodiment of system 10 has reduced noise so that the MTF quality is improved, which leads to improved images. The random nature of the shot noise is such that averaging N captured images is the only available approach to reducing the noise (i.e., improving the SNR). The noise decreases (i.e., the SNR increases) in proportion to $N^{1/2}$. This averaging process can be applied to raw images as well as to processed (i.e., contrast-enhanced) images.

Averaging N captured images is a suitable noise reduction approach so long as the images being averaged are of a fixed object or scene. However, such averaging is problematic when the object moves. In an example embodiment, the movement of object OB is tracked and accurately measured, and the averaging process for reducing noise is employed by accounting for and compensating for the objection motion prior to averaging the raw images.

In an example embodiment, the image averaging process of the present invention uses a correlation function between the sequential images at a common region of interest. The relative two-dimensional image shifts are determined by the location of the correlation peak. The correlation function is processed in the Fourier domain to speed the calculation by using a fast-Fourier transform (FFT) algorithm. The correlation function provided is sampled at the same sampling intervals as the initial images. The detection of the correlation maximum is accurate to the size of one pixel.

An improvement of this measurement technique is to use a 3×3 kernel of pixels centered on the pixel associated with the maximum correlation peak. The sub-pixel location is determined by fitting to two-dimensional parabolic functions to establish a maximum. The (X,Y) image shift is then determined. The images are re-sampled at their shifted locations. If the decimal part of the measured (X,Y) shift is not equal to 0, a bi-linear interpolation is performed. It is also possible to use a Shannon interpolation as well because there is no signal in the image at frequencies higher than the Nyquist frequency. All the images are then summed after being re-sampled, taking in account the (X,Y) shift in the measured correlation.

Optical System

As discussed above, imaging optical system 20 has a depth of field DOF in object space OS and a depth of focus DOF' in image space IS as defined by the particular design of the optical system. The depth of field DOF and the depth of focus DOF' for conventional optical imaging systems can be ascertained by measuring the evolution of the Point Spread Function (PSF) through focus, and can be established by specifying an amount of loss in resolution R that is deemed acceptable for a given application. The "circle of least confusion" is often taken as the parameter that defines the limit of the depth of focus DOF'.

In the present invention, both the depth of field DOF and the depth of focus DOF' are extended by providing optical system 20 with an amount of spherical aberration (SA). In an example embodiment, $0.2\lambda \leq SA \leq 5\lambda$, more preferably $0.27 \mu \leq SA \leq 2\lambda$ and even more preferably $0.5\lambda \leq SA \leq 1\lambda$, where $\lambda$ is an imaging wavelength. In an example embodiment, the amount of spherical aberration SA in the optical system at the imaging wavelength k is such that the depth of field DOF or the depth of focus DOF' increases by an amount between 50% and 500% as compared to a diffraction limited optical system. By adding select amounts of spherical aberration SA, the amount of increase in the depth of field DOF can be controlled. The example optical system designs set forth below add select amounts of spherical aberration SA to increase the depth of field DOF without substantially increasing the adverse impact of other aberrations on image formation.

Since the depth of field DOF and the depth of focus DOF' are related by the axial magnification $M_A$ and lateral magnification $M_L$ of optical system 20 via the relationships DOF'= $(M_A)$ DOF= $(M_L)^2$ DOF, system 10 is said to have an "extended depth of field" for the sake of convenience. One skilled in the art will recognize that this expression also implies that system 10 has an "extended depth of focus" as well. Thus, either the depth of field DOF or the depth of focus DOF' is referred to below, depending on the context of the discussion.

The MTF can also be used in conjunction with the PSF to characterize the depth of focus DOF' by examining the resolution R and image contrast CI of the image through focus. Here, the image contrast is given by $$CI = (I_{MAX} - I_{MIN})/(I_{MAX} + I_{MIN})$$

and is measured for an image of a set of sinusoidal line-space pairs having a particular spatial frequency, where $I_{MAX}$ and $I_{MIN}$ are the maximum and minimum image intensities, respectively. The "best focus" is defined as the image position where the MTF is maximized and where the PSF is the narrowest. When an optical system is free from aberrations (i.e., is diffraction limited), the best focus based on the MTF coincides with the best focus based on the PSF. However, when aberrations are present in an optical system, the best focus positions based on the MTF and PSF can differ.

Conventional lens design principles call for designing an optical system in a manner that seeks to eliminate all aberrations, or to at least balance them to minimize their effect so that the optical system on the whole is substantially free of aberrations.

Figure 8A:
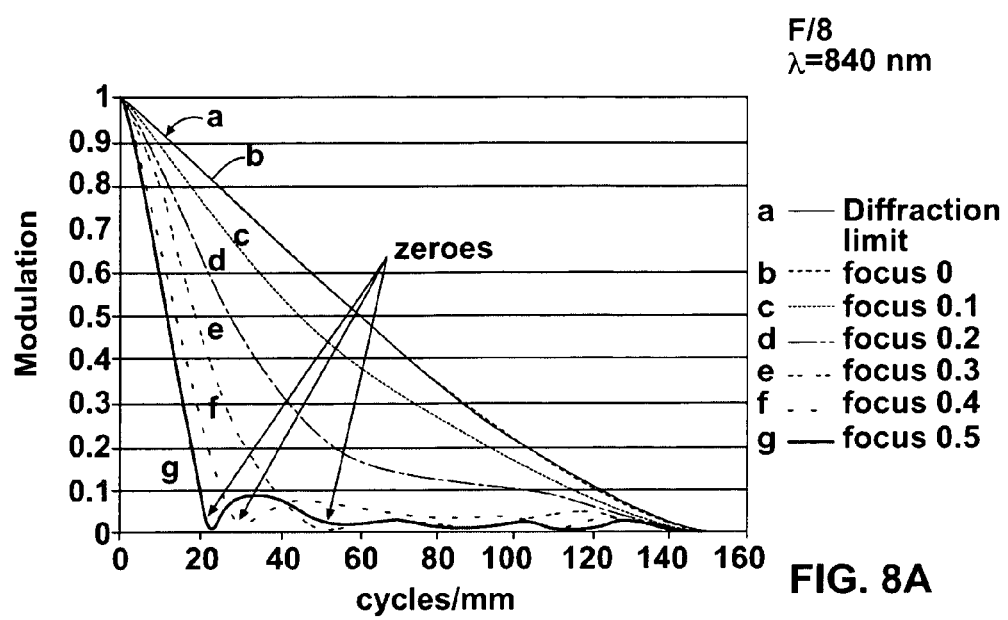
FIG. 8A is a plot of the diffraction-limited modulation transfer function (MTF) for an ideal imaging system for varying amounts of defocus as indicated by curves a through g.
Figure 8B:
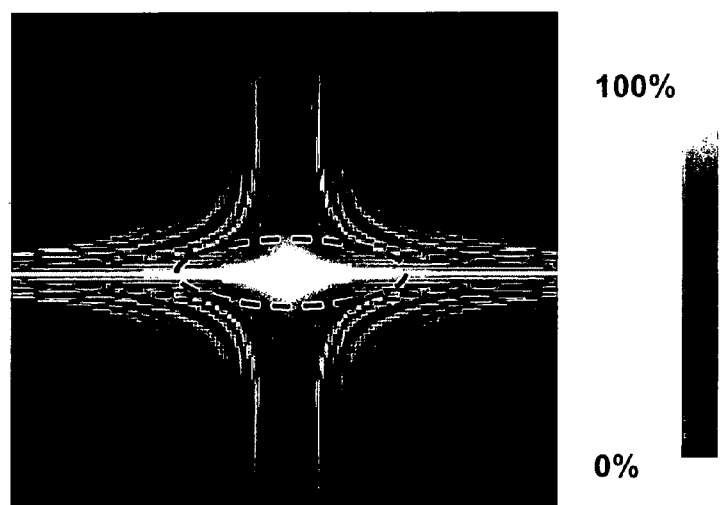
FIG. 8B is a gray-scale plot of the MTF distribution through focus (horizontal axis) for an idealized imaging optical system, with the dashed ellipse indicating an approximate depth of focus and the vertical axis indicating spatial frequency.
Figure 9A:
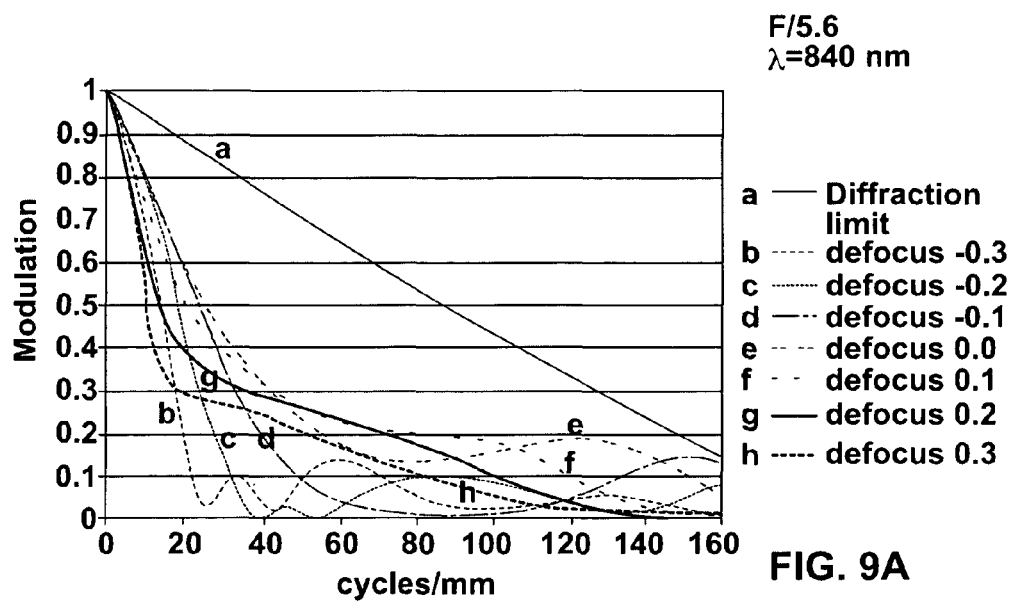
FIG. 9A is a plot of the modulation transfer function (MTF) for varying amounts of defocus for an imaging optical system having an amount of spherical aberration $SA=0.75\lambda$, along with the zero-focus diffraction limited MTF for comparison, as indicated by curves a through h.
Figure 9B:
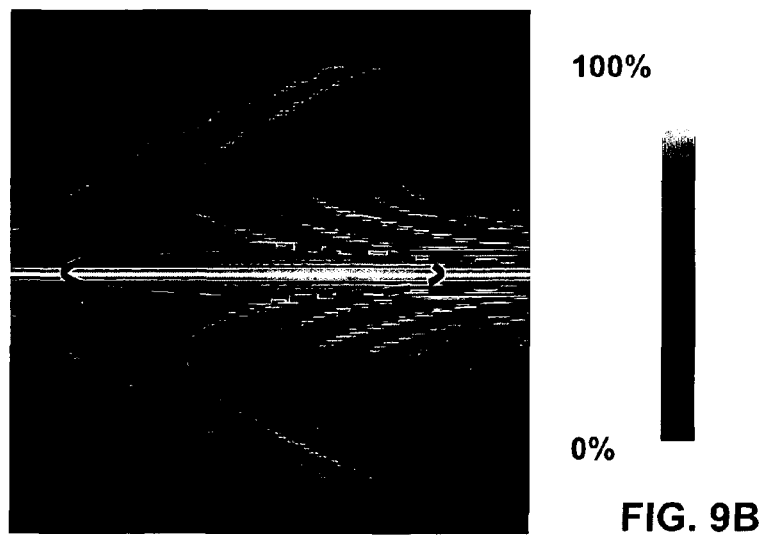
FIG. 9B is the same type of gray-scale through-focus MTF plot as FIG. 8B, but for the MTF of FIG. 9A, illustrating how the depth of focus (dashed line) is axially extended as compared to the diffraction-limited case of FIG. 8B by virtue of the presence of spherical aberration.

However, in the present invention, optical system 20 is intentionally designed to have spherical aberration as a dominant aberration, and optionally has a small amount of chromatic aberration as well. FIG. 8A is a plot of the MTF for an F/8 lens without aberrations (curves a through g), while FIG. 9A is a plot of an MTF for an F 5.6 lens that has SA=0.75λ (curves a through h). FIG. 8B is a gray-scale plot of the MTF through focus for the diffraction-limited case of the F/8 lens of FIG. 8A, and FIG. 9B is a similar gray-scale plot of the MTF through focus for the F/5.6 lens with spherical aberration of FIG. 9A.

The spherical aberration reduces the contrast of the image by reducing the overall level of the MTF from the base frequency $f_0$=0 to the cutoff frequency $f_C$. The cut off frequency $f_C$ is not significantly reduced as compared to the ideal (i.e., diffraction-limited) MTF, so nearly all the original spatial-frequency spectrum is available. Thus, the spatial-frequency information is still available in the image, albeit with a lower contrast. The reduced contrast is then restored by the digital filtering process as carried out by image processing unit 54, as described above.

The amount of spherical aberration SA increases the depth of focus DOF' in the sense that the high spatial frequencies stay available over a greater range of defocus. The digital filtering restores the contrast over the enhanced depth of focus DOF', thereby effectively enhancing the imaging performance of optical system 20.

Spherical aberration is an "even" aberration in the sense that the wavefront "error" is given by $W(\rho)=\rho^4$, wherein $\rho$ is the pupil coordinate. Thus, spherical aberration presents a rotationally symmetric wave front so that the phase is zero. This means that the resulting Optical Transfer Function (OTF) (which is the Fourier Transform of the PSF) is a rotationally symmetric, real function. The MTF, which is the magnitude of the OTF, can be obtained where spherical aberration is the dominant aberration by considering a one-dimensional MTF measurement taken on a slanted edge. This measurement provides all the required information to restore the two-dimensional image via digital signal processing. Also, the phase is zero at any defocus position, which allows for digital image processing to enhance the MTF without the need to consider the phase component (i.e., the phase transfer function, or PFT) of the OTF in the Fourier (i.e., spatial-frequency) space.

As can be seen from FIG. 9A, because the image-wise side of the defocus (as measured from the "best focus" plane) has no zero in the MTF when there is spherical aberration present, there is no contrast inversion. This allows for an image to be formed and detected in this extended depth of focus DOF' (see dashed ellipse in FIG. 9B) to be restored without having to account for detrimental ringing, overshoot or other image artifacts.

An amount of spherical aberration SA of about 0.75λ gives a significant DOF enhancement without forming a zero in the MTF on one defocus side. Beyond about SA=0.75λ, a zero occurs on both sides of defocus from the best focus position. For a diffraction-limited optical system, the depth of focus DOF' is given by the relationship DOF'=±λ/(NA²), where NA is the numerical aperture of the optical system. In an example embodiment, optical system 20 has an NA between about 0.033 and 0.125 (i.e., about F/15 to about F/4, where F/#=1/(2 NA) assuming the small-angle approximation).

By way of example, for F/6.6, a center wavelength of λ=800 nm and a bandwidth of Δλ, the diffraction-limited depth of focus DOF' is about 20 mm, with a transverse magnification of 1/1.4. The introduction of an amount of spherical aberration SA=0.75λ increases the depth of focus DOF' to about 100 mm, an increase of about 5×.

Figure 9C:
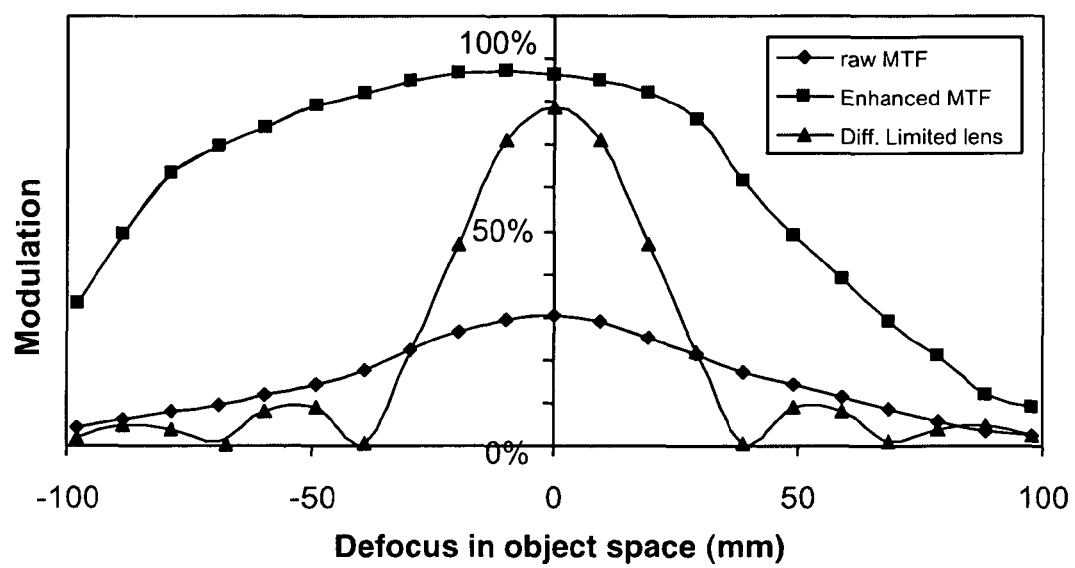
FIG. 9C plots the through-focus MTF at 3 line-pairs per millimeter (lp/mm) in object space for NA=0.0063 for the raw MTF, the enhanced MTF and the diffraction-limited MTF.
Figure 10A:
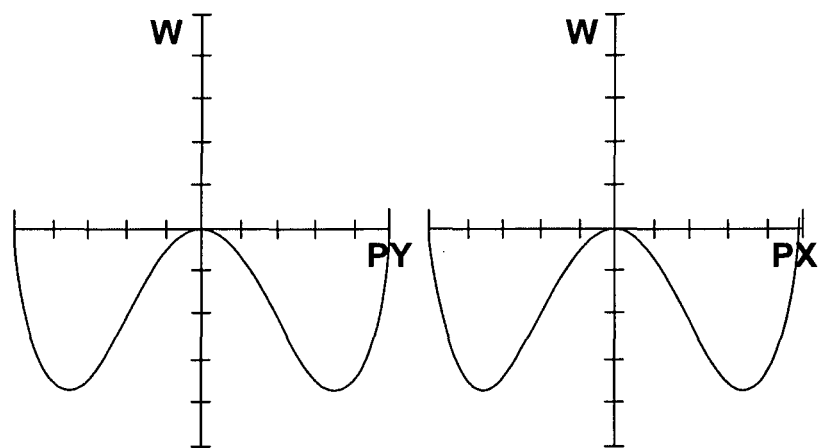
FIGS. 10A-10D are plots of the optical path difference (OPD) for various image heights (0 mm, 20 mm, 30 mm and 60 mm, respectively) for an optical system with $SA=0.7\lambda$.
Figure 10B:
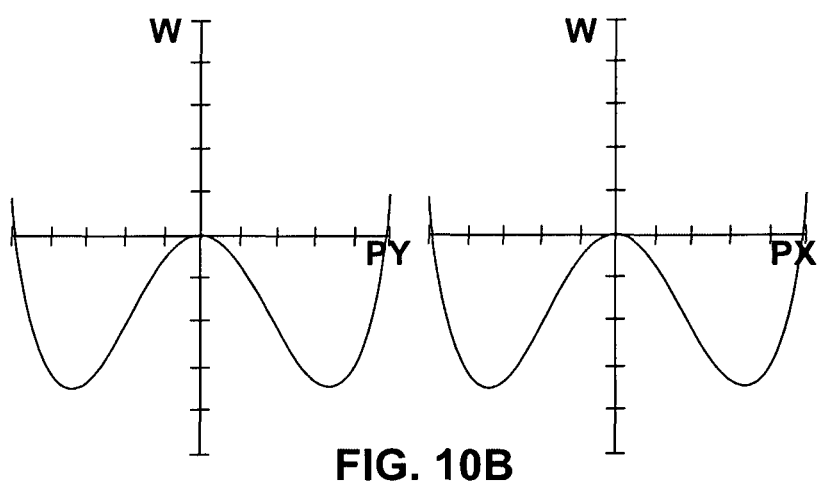
Figure 10C:
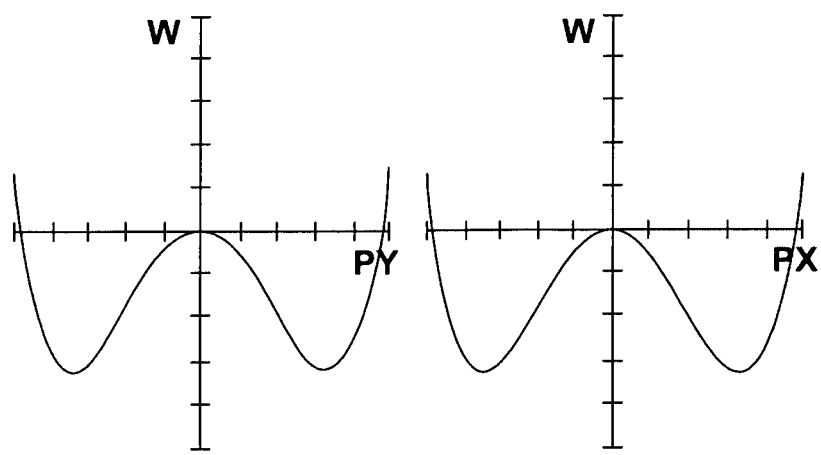
Figure 10D:
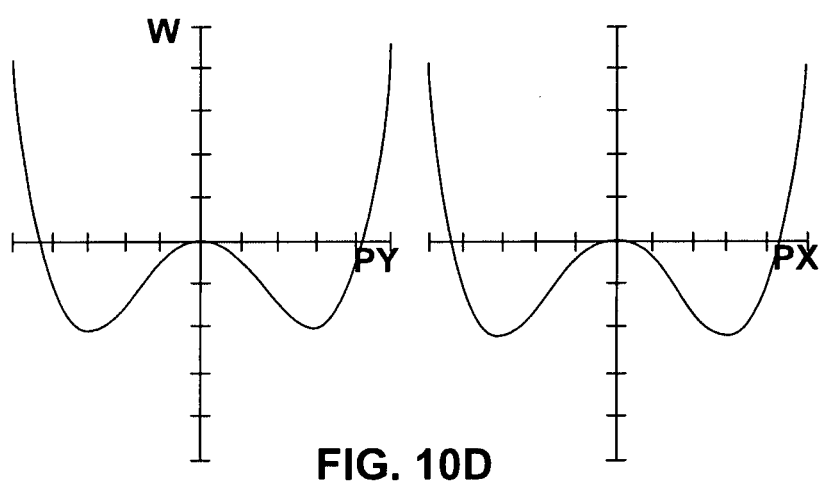

FIG. 9C plots the through-focus MTF at 3 lp/mm in object space for NA=0.0063 for the raw MTF, the enhanced MTF (i.e., MTF') and the diffraction-limited MTF.

FIGS. 10A-10D are plots of the optical path difference (OPD) for various image heights (0 mm, 20 mm, 30 mm and 60 mm, respectively) for an example optical system 20 having an amount of spherical aberration SA=0.7λ.

Example Single-Lens Optical Systems

Figure 11:
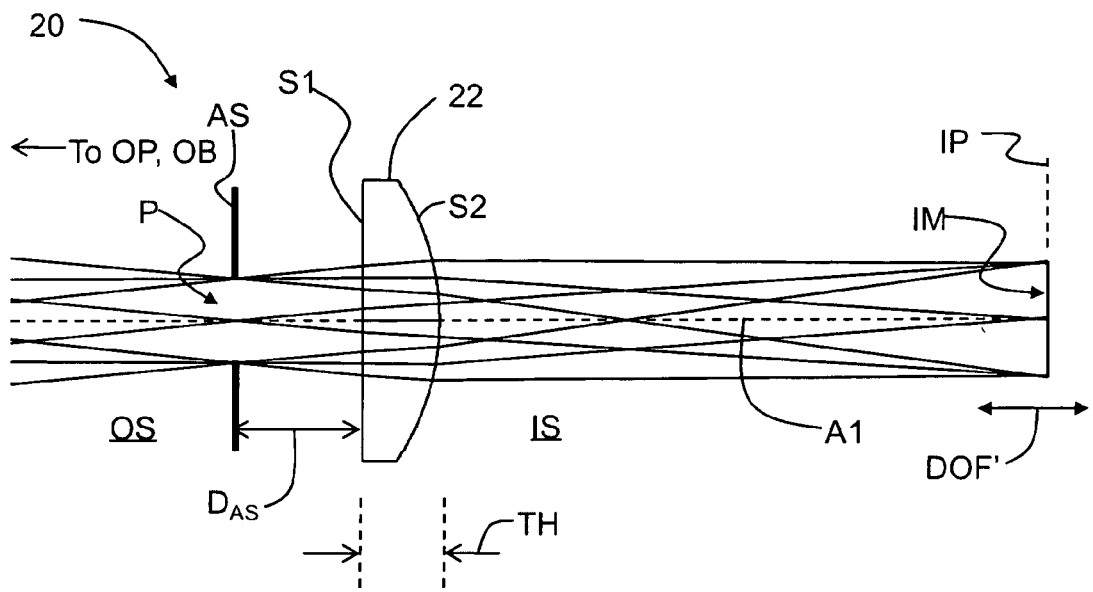
FIG. 11 is a schematic diagram of an example embodiment of the single-lens optical system of the EDOF imaging system of FIG. 1, wherein the single lens is a plano-convex lens with an objectwise plano surface.

FIG. 11 is a schematic side view of an example embodiment of a single-lens optical system 20 according to the present invention. As discussed above in connection with the generalized embodiment of system 10 of FIG. 1, optical system 20 consists of single lens element 22 arranged along optical axis A1, and aperture stop AS arranged objectwise of the single lens element. Lens element 20 has a front (i.e., objectwise) surface S1 and a rear (i.e., imagewise) surface S2, and a center (axial) thickness TH. Aperture stop AS is arranged along optical axis A1 a distance $D_{AS}$ away from lens front surface S1 and defines a pupil P having a radial coordinate ρ. Pupil P also defines the optical system's entrance and exit pupils as viewed from the object and image spaces, respectively.

In the example embodiment of optical system 20 of FIG. 11, lens element 22 is a plano-convex lens with objectwise surface S1 as the plano surface. Also in an example embodiment, surface S2 is an aspheric surface. In an example embodiment, lens element 22 is integrally formed from a single material, such as glass or plastic.

Table 1 below sets forth an example design for optical system 20 of FIG. 11.

TABLE 1

Example Optical System 20

| | |
|---|---|
| Lens Type | Plano-Convex |
| Material | Fused Silica; $n_d$ = 1.458464; $v_d$ = 67.82 |
| Radius of curvature of surface S2 | 23 mm |
| Center (axial) thickness TH | 7 mm |
| Working diameter | 14 mm |
| Entrance pupil diameter | 8 mm |
| $D_{AS}$ | 11 mm |
| F/# | 6.6 |
| Center wavelength λ | 800 nm (near IR) |
| Wavelength bandwidth Δλ | 40 nm to 200 nm |
| Focal length | 50 mm |
| Working Depth of Focus DOF' | 0.77 mm ~5X (or ~500%) greater than the diffraction limited DOF'. |
| Lateral Magnification $M_L$ | (1/11.4) |
| Clear Aperture CA | 12 mm |
| Depth of Field DOF | 100 mm |
| Resolution R | 3 lines/mm at 60% contrast |
| Spherical aberration SA | 0.75 λ |
| Chromatic aberration | 0.4 mm in [735 nm-890 nm] |
| Coma | Null |
| Field Curvature | Radius in image space: −20 mm |
| Astigmatism | < λ/10 |

This single-element design for optical system 20 provides the required spherical aberration at F/6.6 that matches well to the required practical working conditions for performing a number different EDOF applications, such as iris recognition. Other options for lens element 22 include using non-glass materials such as plastic. An advantage of the single-element design for optical system 20 is that it makes the system very compact so that the resultant EDOF optical imaging system 10 is also compact. A wide variety of single lens elements 22 are also readily commercially available as "off the shelf" components.

In an example embodiment, distance $D_{AS}$ is that which substantially minimizes comatic aberration. It is noted here that the presence of spherical aberration SA in optical system 20 creates an axial "zero coma" position for aperture stop AS that is objectwise of lens element 22. Thus, in an example embodiment, aperture stop AS preferably resides at or near the zero-coma position. Here, the phrase "near" the zero-coma position means within the positioning tolerance, which in an example embodiment is about a few millimeters.

Figure 12:
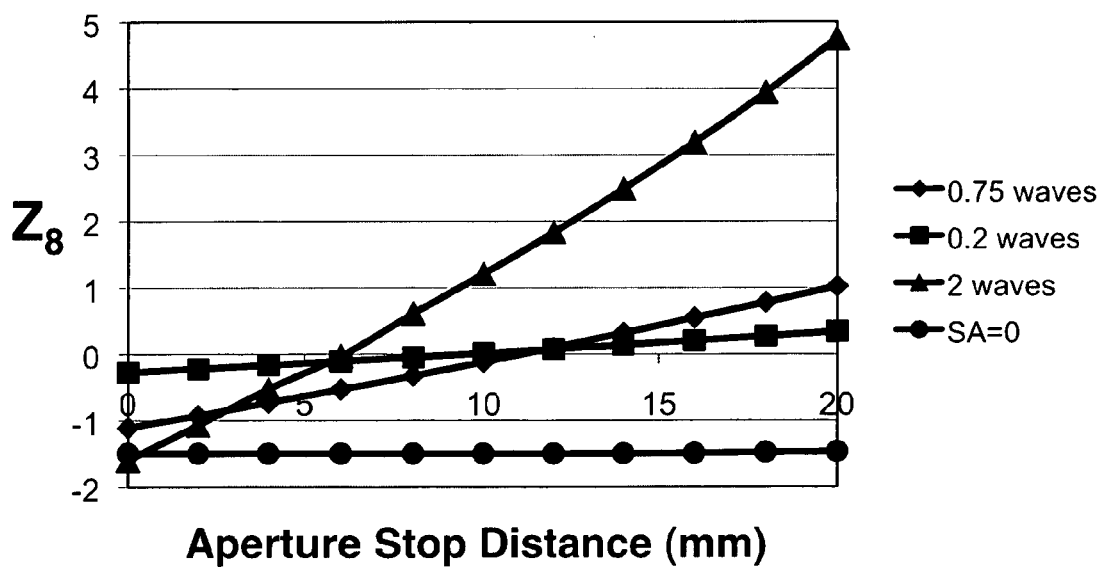
FIG. 12 is a plot of coma ($Z_8$) versus aperture stop position (mm) relative to the single lens element for an example optical system with varying amounts of spherical aberration SA (including SA=0), illustrating the formation of a zero-coma axial position when the optical system has spherical aberration.

FIG. 12 plots as a function of aperture stop axial position (mm) the eighth Zernike coefficient of the Zernike polynomial representation of wavefront aberrations. The eighth Zernike coefficient (denoted herein in non-conventional form as "$Z_8$" for the sake of simplicity) is representative of the amount of coma in the wavefront and has form given by the equation $(3\rho^2 - 2)\rho \cdot \sin A$, where A is the angular pupil coordinate and ρ is the normalized radial pupil coordinate.

Values for spherical aberration of SA=0 (i.e., no spherical aberration), 0.2λ, 0.75λ and 2λ are shown. The plots are based on a single-element lens 22 made of fused Silica with f=50 mm, F/6.6, and operating at an imaging wavelength k=700 nm. In FIG. 12, the curve for the SA=0 case corresponds to a plano-hyperbolic lens element 22 with an objectwise plano surface and an imagewise aspheric hyperbolic convex surface. The hyperbolic surface is exactly stigmatic (i.e., has no aberrations) on the axis.

For the curve having SA=0, there is no zero coma position over the 20 mm distance range. The amount of coma for this case is also too great to achieve acceptable image quality over the entire image field. The region of good image quality is restricted only to a narrow field surrounding the lens axis. This is why a well-corrected single lens element is typically not considered for most imaging applications, and is generally only used for narrow field or on-axis applications, such as fiber optic coupling.

It is important to note that coma is always present when imaging with a single, positive lens element, and that the sign of such coma is negative. Having positive spherical aberration SA gives rise to a fortuitous variation with coma with aperture stop distance $D_{AS}$. The slope of the coma amplitude versus the distance $D_{AS}$ is positive and a zero-coma position arises objectwise of lens element 22. By disposing aperture stop AS at or near this zero-coma position, the coma of the single lens is substantially eliminated across the entire image field. In an example embodiment, $D_{AS}$ is preferably in the range 1 mm≦$D_{AS}$≦20 mm, and more preferably in the range 1 mm≦$D_{AS}$≦15 mm.

The main aberration that remains in optical system 20 is spherical aberration, which is constant across the entire image field, which is required to achieve the EDOF effect over the entire image field. In conventional optical systems, spherical aberration is deemed undesirable, and either aspherization or the additional of negative lens elements is used to eliminate or make negligible the effects of spherical aberration created by the use of a single lens element.

From the plot of FIG. 12, it can be seen that the single lens element with SA=0.75λ has a zero-coma axial position at a distance of about 11 mm from lens element 22. This distance is relatively small and allows for the formation of a compact, small-form-factor EDOF systems and devices, such device 52 shown in FIG. 2.

In an example embodiment, astigmatism in optical system 20 is about λ/10 and so does not significantly affect the image quality. In an example embodiment, optical system 20 is not entirely corrected for chromatic aberration, which can be advantageous in that some chromatic aberration can be used to further increase the depth of field DOF when used with a relatively large imaging bandwidth Δλ by eliminating some zeroes in the MTF that might otherwise occur. Otherwise, the chromatic aberration is limited by using an Abbe number V>60 so as not to diminish the MTF by introducing lateral color in the edge of the field of a relatively large field. The axial chromatic aberration can be set at different values by the choice of glass. Standard optical glass has an Abbe number in the range from 20 to 64.

Though axial chromatic aberration increases the depth of field DOF, it decreases the MTF. This in turn requires increasing the MTF "amplification" in the digital processing, which increases the SNPD (Spectral Noise Power Density). The Abbe number is thus preferably selected to achieve a good compromise between diminishing the MTF while increasing the depth of field DOF. In an example embodiment, the glass material is selected such the added increase in the depth of field DOF (i.e., added to the increase provided by the spherical aberration) is up to about 20%, while the decrease in the average MTF level is no more than about 25%.

Fused silica (Abbe number V=67.8) is a good glass choice when using an imaging wavelength λ having a relatively wide near-IR spectral bandwidth, e.g., Δλ=155 nm (e.g., from 735 nm to 890 nm). In an example embodiment, an acceptable amount of axial chromatic aberration is about 0.34 mm. When using a narrow-band imaging spectrum Δλ such as from a laser or an LED with a near-IR spectral bandwidth Δλ of about 50 nm FWHM, the axial chromatic aberration is smaller so that more dispersive glasses can be used for lens element 22. In the optical system 20 set forth in Table 1, the lateral chromatic aberration is 10 μm at the field edge.

In some cases, field curvature needs to take into account to set the best focus plane. The optical system 20 set forth in Table 1 has a field curvature of 120 mm radius in object space or −60 mm radius in image space. However, since field curvature is simply a form of defocus, adverse effects presented by this amount of field curvature can be overcome in certain cases by the gain in depth of focus DOF' due to the presence of spherical aberration.

The optical system 20 of Table 1 has a resolution of R=120 μm in object space, which is more than adequate to resolve details in many objects, including iris patters to perform iris recognition.

Additional Single-Lens Optical System Embodiments

Figure 13:
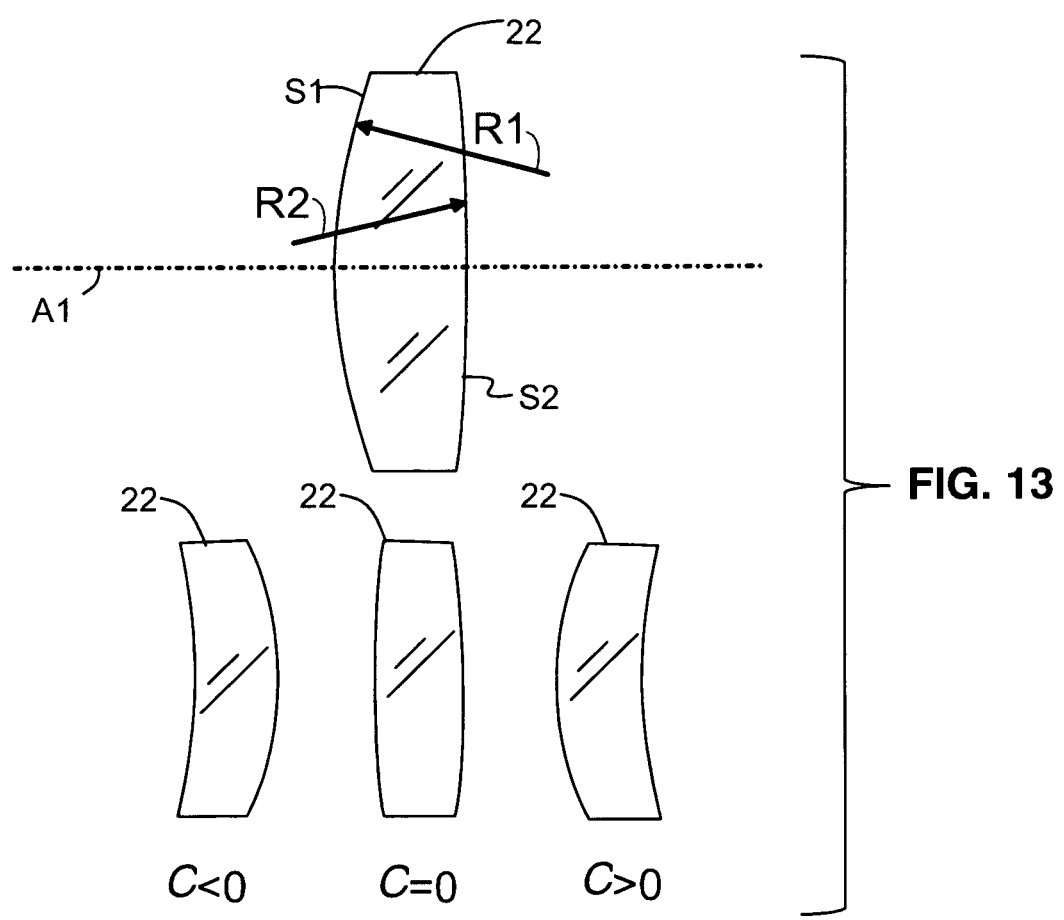
FIG. 13 is a schematic diagram of an example single lens element illustrating the radii of curvatures R1 and R2 of respective surfaces S1 and S2 and showing how the lens shape or "curvature" C changes as a function of R1 and R2.
Figure 14:
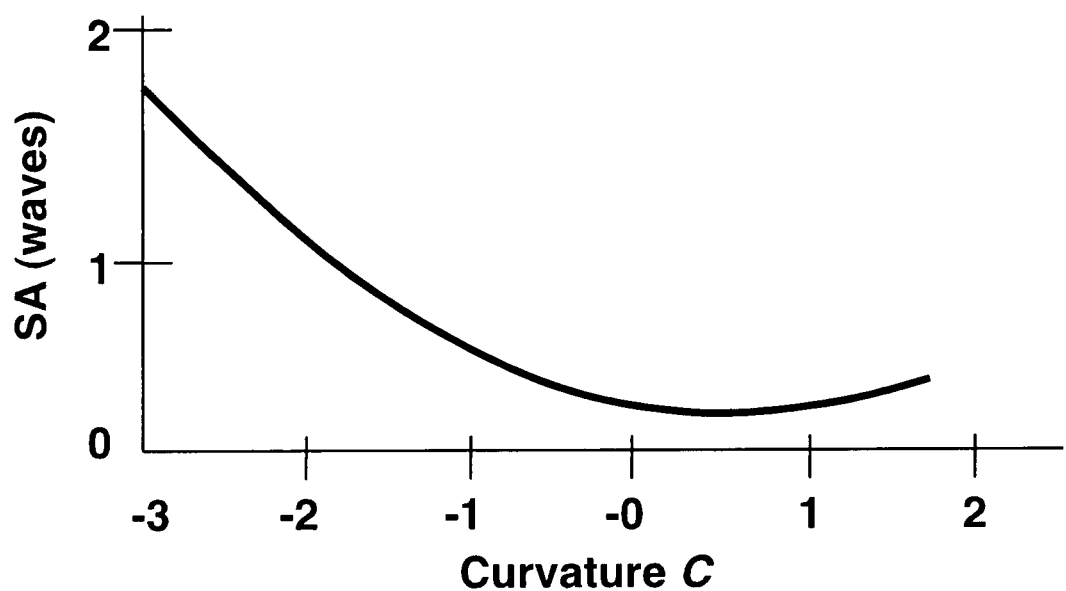
FIG. 14 plots the amount of spherical aberration SA (waves) versus the lens curvature C for a single lens element.

The amount of spherical aberration in optical system 20 is a function of the refractive index, the focal length f, the F/# and the curvature C of lens element 22. With reference to FIG. 13, the lens curvature (also referred to as the "camber" or the "lens shape") C is defined as:

$$C = \frac{\left(\frac{1}{R_1} + \frac{1}{R_2}\right)}{\left(\frac{1}{R_1} - \frac{1}{R_2}\right)}$$

where R1 is the radius of curvature of the most objectwise surface S1 and R2 is the radius of curvature of the most imagewise surface S2. FIG. 14 plots a typical variation of spherical aberration SA (in waves) as the function of lens curvature C for a lens element 22 having a focal length of 20 mm, a refractive index of 1.51 at a wavelength of 750 nm, and an F/# of F/5.6. An amount spherical aberration SA=0.75λ is achieved at C=−1.5. As discussed above, aperture stop AS is preferably axially positioned at or near the zero coma position to maximize the available image field.

Figure 15:
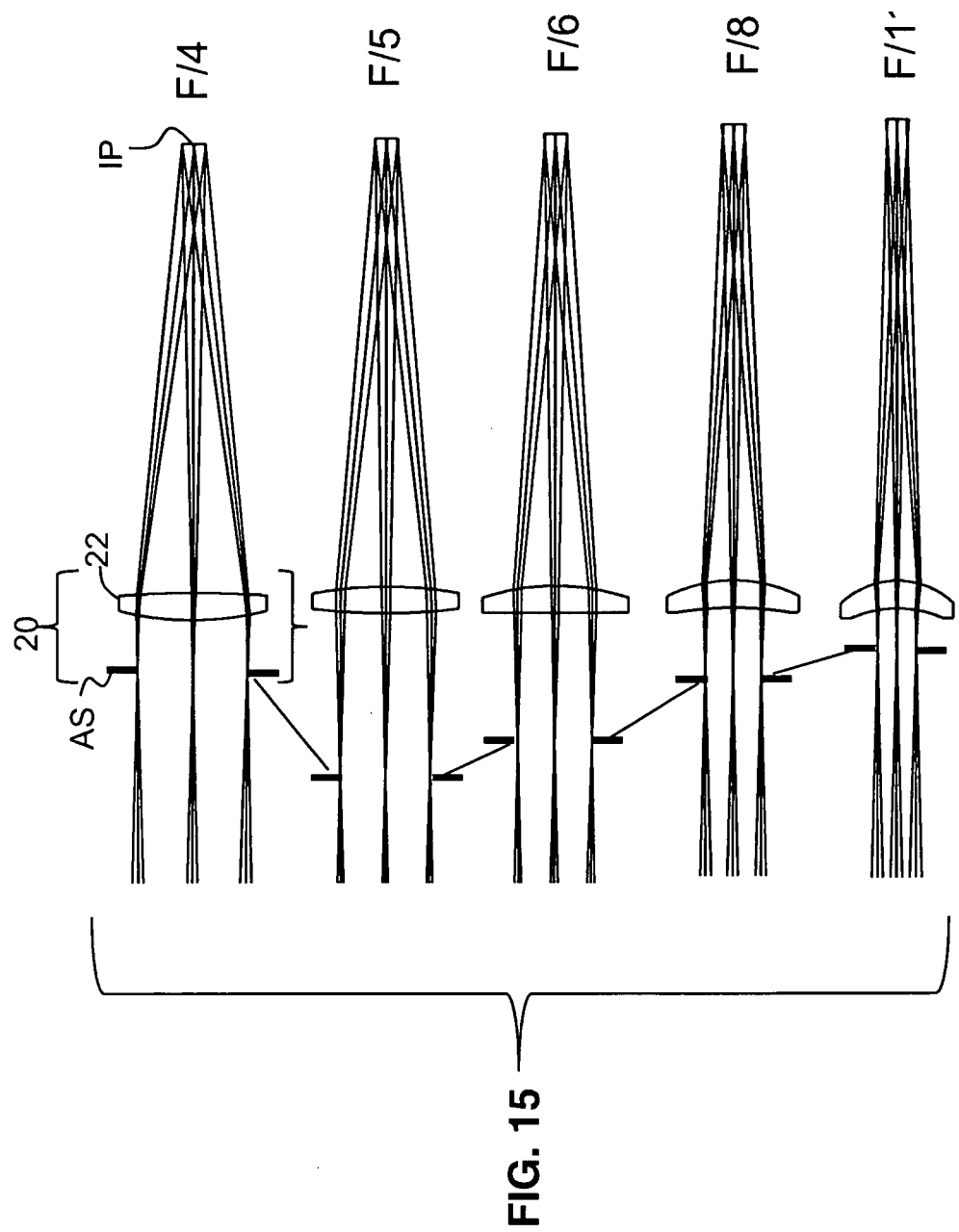
FIG. 15 shows a series of lens elements and aperture stop positions illustrating the variation of F/# from F/4 to F/11 and the corresponding change in curvature C needed to maintain an amount of spherical aberration $SA=0.75\lambda$ for a single lens element made of borosilicate glass BK7 with a focal length f=50 mm.

If the F/# number of optical system 20 is to be adjusted, then the curvature C of lens element 22 has to be adjusted (i.e., a different lens needs to be selected) in order to maintain a desired amount of spherical aberration SA. FIG. 15 shows a series of lens elements 22 and aperture stop positions illustrating the variation of F/# from F/4 to F/11. Note the corresponding change in curvature C needed to maintain an amount of spherical aberration SA=0.75λ for a single lens element made of borosilicate glass BK7 with a focal length f=50 mm.

The following Tables T1 through T8 set forth the values for radii R1 and R2 and curvature C suitable to achieve SA=0.75λ at λ=750 nm for single lens element 22 made of BK7 glass ($n_d$=1.5168) having different F/#s and focal lengths f. In Tables T1 through T8, all dimensions are in mm, except the curvature C, which is dimensionless.

Table T1 for F/2 Glass BK7 $n_d$ = 1.5168

| f | R1 | R2 | C | $D_{AS}$ |
|---|---|---|---|---|
| 2 | 1.54 | −2.382 | 0.215 | 0.2 |
| 2.5 | 1.49 | −5.1 | 0.548 | 0 |

Table T2 for F/2 Glass N-LASF44 $n_d$ = 1.81042

| f | R1 | R2 | C | $D_{AS}$ |
|---|---|---|---|---|
| 2 | 3.244 | −2.688 | −0.094 | 0.7 |
| 2.5 | 3.264 | −4.277 | 0.134 | 1 |
| 3 | 3.275 | −7.55 | 0.395 | 1.2 |
| 4 | 3.047 | 74.193 | 1.086 | 0.5 |

Table T3 for F/3 Glass BK7 $n_d$ = 1.5168

| f | R1 | R2 | C | $D_{AS}$ |
|---|---|---|---|---|
| 5 | 8.24 | −3.25 | −0.434 | 0.03 |
| 7.5 | 7.72 | −6.63 | −0.076 | 1.29 |
| 10 | 7.715 | −13.205 | 0.262 | 1.72 |
| 12 | 7.3 | −33.08 | 0.638 | 0 |

Table T4 for F/3 Glass N-LASF44 $n_d$ = 1.81042

| f | R1 | R2 | C | $D_{AS}$ |
|---|---|---|---|---|
| 5 | 43.255 | −4.24 | −0.821 | 0.66 |
| 7.5 | 18.96 | −8.07 | −0.403 | 2.35 |
| 10 | 16.72 | −13.91 | −0.092 | 4.07 |
| 15 | 16.7 | −38.15 | 0.391 | 6.57 |
| 20 | 15.6 | 815.35 | 1.039 | 3.12 |
| 25 | 18.63 | 287.57 | 1.139 | 0 |

Table T5 for F/4 Glass BK7 $n_d$ = 1.5168

| f | R1 | R2 | C | $D_{AS}$ |
|---|---|---|---|---|
| 10 | 42.91 | −5.67 | −0.767 | 1.69 |
| 15 | 24.92 | −10.64 | −0.402 | 4.2 |
| 20 | 23.12 | −17.56 | −0.137 | 6.51 |
| 25 | 23.1 | −27.42 | 0.086 | 3.12 |
| 30 | 23.21 | −43.36 | 0.303 | 8.23 |
| 35 | 21.46 | −103.34 | 0.656 | 2.48 |
| 40 | 23.89 | −136.6 | 0.702 | 0 |

Table T6 for F/4 Glass N-LASF44 $n_d$ = 1.81042

| f | R1 | R2 | C | $D_{AS}$ |
|---|---|---|---|---|
| 5 | −6.24 | −2.94 | −2.782 | 0 |
| 7.5 | −15.37 | −4.66 | −1.870 | 0.96 |
| 10 | −39.09 | −6.82 | −1.423 | 2.22 |
| 15 | 220.81 | −12.51 | −0.893 | 5.18 |
| 20 | 71.26 | −20.05 | −0.561 | 8.1 |
| 30 | 51.11 | −43.45 | −0.081 | 15 |

-continued

Table T6 for F/4 Glass N-LASF44 $n_d = 1.81042$

| f | R1 | R2 | C | $D_{AS}$ |
|---|---|---|---|---|
| 35 | 50.02 | −60.87 | 0.098 | 18 |
| 40 | 50.01 | −84.7 | 0.258 | 20.6 |
| 50 | 50.86 | −176.15 | 0.552 | 23.2 |
| 75 | 55.38 | 774 | 1.154 | 3.3 |

Table T7 for F/5.6 Glass BK7 $n_d = 1.5168$

| f | R1 | R2 | C | $D_{AS}$ |
|---|---|---|---|---|
| 10 | −7.76 | −3.49 | −2.635 | 0.24 |
| 15 | −18.48 | −5.72 | −1.897 | 1.82 |
| 20 | −41.8 | −8.42 | −1.504 | 3.7 |
| 25 | −108.76 | −11.55 | −1.238 | 5.8 |
| 30 | −860.4 | −15.1 | −1.036 | 8.03 |
| 35 | 282.01 | −19.06 | −0.873 | 10.38 |
| 40 | 155.26 | −23.42 | −0.738 | 12.78 |
| 50 | 105.66 | −33.45 | −0.519 | 17.7 |
| 75 | 88.03 | −67.28 | −0.134 | 29.16 |
| 100 | 88.1 | −120.75 | 0.156 | 36.2 |
| 120 | 88.39 | −199 | 0.385 | 33.77 |
| 140 | 83.66 | −493.26 | 0.710 | 8.77 |

Table T8 for F/5.6 Glass N-LASF44 nd = 1.81042

| f | R1 | R2 | C | $D_{AS}$ |
|---|---|---|---|---|
| 6 | −2.76 | −2.59 | −31.471 | 0 |
| 10 | −5.89 | −4.14 | −5.731 | 0.54 |
| 15 | −11.8 | −6.59 | −3.530 | 2.12 |
| 20 | −20.8 | −9.58 | −2.708 | 4.06 |
| 30 | −55.33 | −17.05 | −1.891 | 8.67 |
| 35 | −89.36 | −21.51 | −1.634 | 11.25 |
| 40 | −150.41 | −26.45 | −1.427 | 14 |
| 50 | −759.8 | −37.79 | −1.105 | 19.8 |
| 75 | 282.26 | −75.11 | −0.580 | 37.7 |
| 100 | 205.5 | −128.56 | −0.230 | 52 |
| 150 | 190.9 | −314.41 | 0.244 | 81 |
| 200 | 196 | −831 | 0.618 | 92.64 |

At each defined value of F/# and focal length f there is a minimum value $SA_M$ for spherical aberration SA. The value of $SA_M$ depends on the F/#, focal length f and refractive index n of the optical material making up lens element 22. In an example embodiment, the value of $SA_M$ preferably is equal to about 0.75λ to provide optimal EDOF results. This condition limits the range of focal length f and aperture of single lens element 22.

The center thickness TH of lens element 22 preferably has a tolerance in the range from about 0.25 $D_L$ to 0.1 $D_L$, where $D_L$ is the lens element diameter. Generally, manufacturing and mounting issues determine the best thickness TH.

The domain of F/# and focal length f covered by single lens element 22 with SA=0.75λ is set forth below in Table T9.

TABLE T9

| F/# Domain | | |
|---|---|---|
| f | min F/# | max F/# |
| 4 | 3.2 | 6.4 |
| 5 | 3.36 | 6.72 |
| 7 | 3.65 | 7.3 |
| 10 | 3.95 | 7.9 |
| 15 | 4.35 | 8.7 |
| 20 | 4.66 | 9.32 |
| 38 | 5.5 | 11 |
| 50 | 5.9 | 11.8 |
| 75 | 6.5 | 13 |
| 100 | 7 | 14 |
| 150 | 7.7 | 15.4 |
| 200 | 8.3 | 16.6 |
| 300 | 9.2 | 18.4 |
| 500 | 10.4 | 20.8 |
| 1000 | 12.4 | 24.8 |
| 2000 | 14.7 | 29.4 |

The minimum F/# is set by aperture stop AS where the curvature C corresponds to a minimum spherical aberration $SA_M$=0.75λ. A greater aperture diameter or lower F/# will produce too much spherical aberration SA and reduce the EDOF effect. The maximum F/# is limited by a value for curvature C where the field must be reduced due to an increase in astigmatism. While there is no real threshold for the F/#, good performance is generally easier to obtain when the F/# does not exceed twice the minimum F/#.

Figure 16:
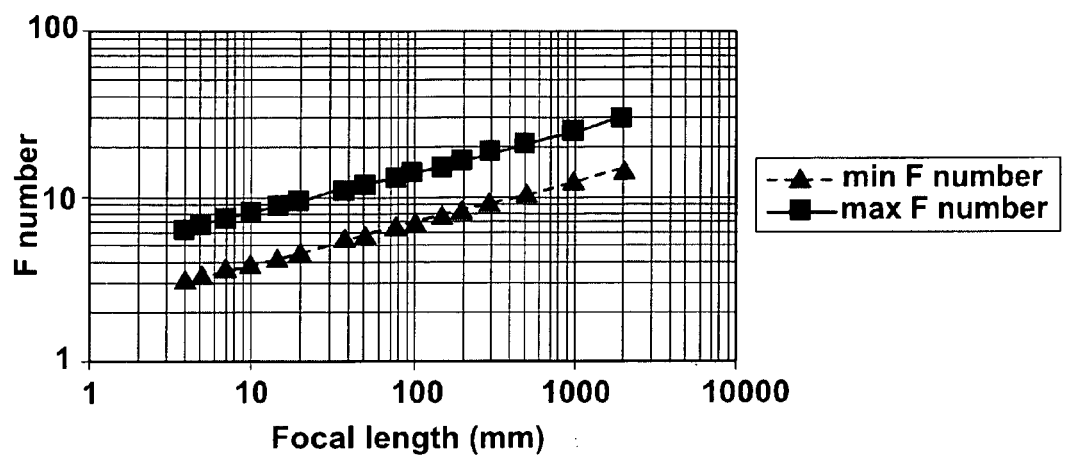
FIG. 16 plots an example range of the F/# as a function of focal length f, wherein the maximum F# is twice the minimum F/#.

FIG. 16 plots the range of the F/# as a function of focal length f as set forth in Table T9, wherein the maximum F# is twice the minimum F/#. In an example embodiment, the diameter of lens element 22 is at least about 1.2 times the diameter of aperture stop AS.

Enhanced Aperture Single Lens

Single lens element 22 of optical system 20 can be made to have a larger aperture (diameter) by using optical materials with a relatively high refractive index. At a constant focal length f, increasing the refractive index n reduces the spherical aberration SA but increases the radius of curvature of the lens surface. Hence, the aperture required to obtain SA=0.75λ increases.

For an example lens element 22 with a focal length f=10 mm and made of borosilicate glass BK7 with nd=1.5168, vd=64, the minimum F/# available that yields SA=0.75λ is F/2.9. Selecting a higher index glass, such as N-LASF41 with nd=1.835 and vd=43.129 reduces the spherical aberration SA, so it is necessary to select a curvature C that produces more spherical aberration to compensate for the reduction in SA. The new minimum F/# decreases to F/2.5 and provides SA=0.75λ. The search for maximum aperture or minimum F/# requires selecting higher index materials.

High-refractive-index glasses have more chromatic dispersion (i.e., a low Abbe number). This usual rule can limit the choice of glass when broad-spectrum light is used for imaging. On the other hand, in some applications the addition of chromatic aberration favorably combines with the spherical aberration to achieve EDOF imaging.

Aspheric Surfaces and Diffractive Features

Figure 17:
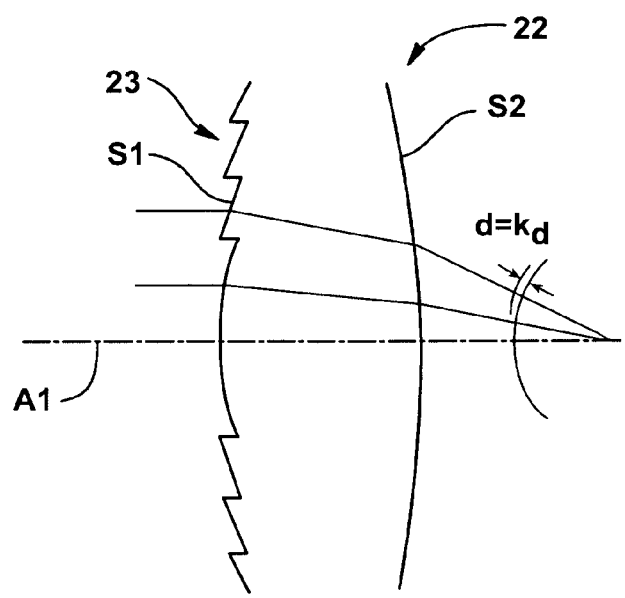
FIG. 17 is a schematic diagram of a single lens element for the single-lens EDOF imaging system of FIG. 1, wherein the objectwise surface includes a diffractive feature.

In the case where the use of high index glass is followed by a higher chromatic dispersion in a manner that requires compensation for the resultant chromatic aberration, an example embodiment of single lens element 22 includes at least one diffractive feature 23 on at least one side (surface) of the lens, as illustrated in FIG. 17. Various technologies can be used to manufacture diffractive feature 23, such affixing a molded diffractive structure to one of the lens surfaces, molding the entire lens so that the diffractive feature is integrally formed in one of the lens surfaces, or diamond turning the lens to carve the diffractive feature into the lens surface. The resulting aspherisation from diffractive feature 23 allows an increase in the aperture of lens 22 by reducing the amplitude of spherical aberration to SA=0.75λ.

The second advantage of aspherization is that is increases the lens aperture without having to choose a glass with a high index of refraction while keeping the same amount of spherical aberration. A high index of refraction is about 1.8 for glass, but this value is generally not achievable in low-cost molded plastics such as Poly(methyl methacrylate), referred to as PMMA ($n_d$=1.4917 and $v_d$=57.44).

In one example embodiment, single lens element 22 is formed from an acrylic material and has a focal length f=10 mm and F/#=F/4, with one of surfaces S1 and S2 including diffractive feature 23, while the other surface is also aspherical (but not diffractive), thus making the lens "asphero-diffractive." The function of diffractive feature 23 is to provide substantial correction of chromatic axial aberration produced by the dispersion of the optical material making up lens element 22. The diffraction order is chosen to allow the largest spectral width. In an example embodiment, two aspherical surfaces are optimized to achieve SA=0.75λ. The use of two aspherical surfaces on lens element 22 allows a significant increase of the aperture that cannot be achieved with spherical surfaces alone.

The diffractive surface S1 has full first-order diffraction efficiency at the central wavelength $\lambda_o$ of the light spectrum. With reference again to FIG. 17, in an example embodiment diffractive feature 23 has "Fresnel lens" shape with steps of $k\lambda_o$ optical path difference with k=1 for order 1. The number of steps in diffractive feature 23 is calculated to compensate for the chromatic aberration that arises from the choice of optical material. Acrylic (with $n_d$=1.4917 and $v_d$=57.44) is an example material for single lens element 22 where such compensation is useful.

Diffractive feature 23 operates as a rotationally symmetric blazed grating. The local step function of the radial distance from the lens axis is designed to reduce or eliminate chromatic dispersion. There are many methods for calculating the shape of diffractive feature 23, such as finite element numerical methods that can be readily carried out on a computer.

Figure 18:
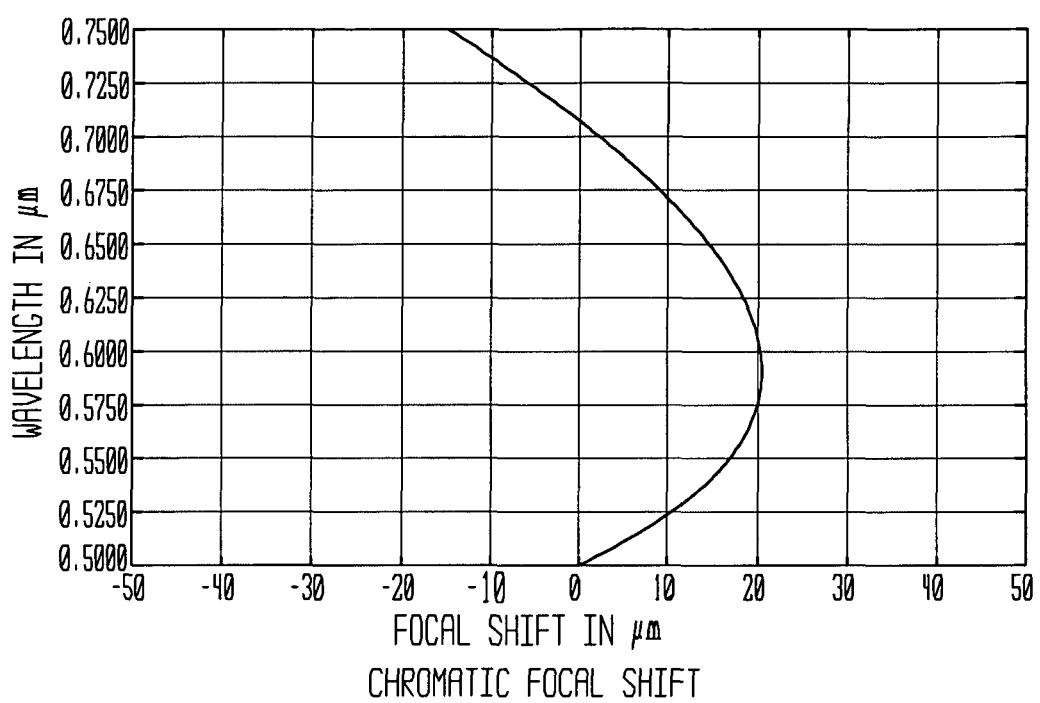
FIG. 18 is an example plot of the axial focal shift (μm) versus wavelength (μm) for an achromatized single lens element having a diffractive feature, where the achromatization is centered at $\lambda=590$ nm.

The achromatization from diffractive feature 23 is illustrated in the plot of FIG. 18 of wavelength (μm) versus focal shift (μm), where the achromatization is centered at λ=590 nm. Note that a second-order ("secondary") chromatic aberration remains. The secondary chromatic aberration reduces the MTF when a relatively broad light spectrum is used. However, this reduction in MTF can be taken into account in the MTF gain function. The secondary chromatic aberration does not necessarily reduces the depth of focus DOF' and in certain cases can increase the depth of focus by averaging the diffraction ring on the point spread function (PSF) and removing unwanted contrast inversion that occurs at high spatial frequencies. Thus, in an example embodiment, optical system 20 includes a small amount of chromatic aberration.

In an example embodiment, the spherical aberration SA is controlled to be about 0.75λ within the imaging bandwidth Δλ and over the entire image field. Some residual lateral color can occur, and is a function of the distance of the diffractive feature 23 from aperture stop AS. This distance can be different from the "zero" coma distance, and in an example embodiment trade-offs are made between amounts of residual coma and lateral color needed to achieve a desired imaging performance.

Table T10 below sets forth paraxial data for an example embodiment of single-lens optical system 20.

TABLE T10

| Paraxial Lens Data | |
|---|---|
| Effective focal length | 20 mm |
| Aperture | F/4 |
| Image field size diameter | 6 mm |
| Object field size | 16° |
| Material | PMMA |

This design is useful for CCTV cameras because it matches well with ⅓" and ¼" image sensor sizes.

The curvature C and aspherization of both surfaces S1 and S2 of the single lens element 22 associated with Table T10 provides a controlled amount of spherical aberration close to SA=0.75λ. The dual aspherization allows for a larger aperture as compared to a purely spherical design with the same lens material, the same focal length and the same amount of spherical aberration SA. The PMMA or acrylic plastic used in the example lens element 22 of Table T10 is a common plastic used for optics. While other transparent plastics can be used, PMMA has very good index homogeneity and low irregularity, which reduces undesirable wavefront distortion. Use of a diffractive feature 23 is an option and serves to reduce the axial chromatic aberration, thereby avoiding the reduction in MTF when imaging with a broad wavelength spectrum.

Figure 19A:
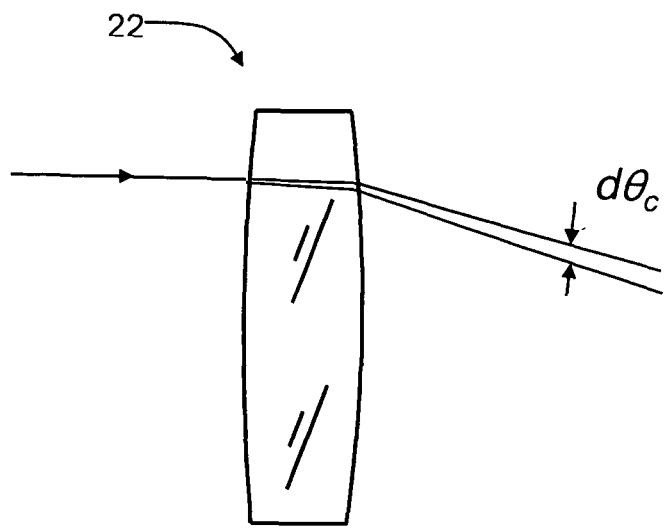
FIG. 19A is a close-up view of a single lens elements showing the refractive chromatic deviation angle.
Figure 19B:
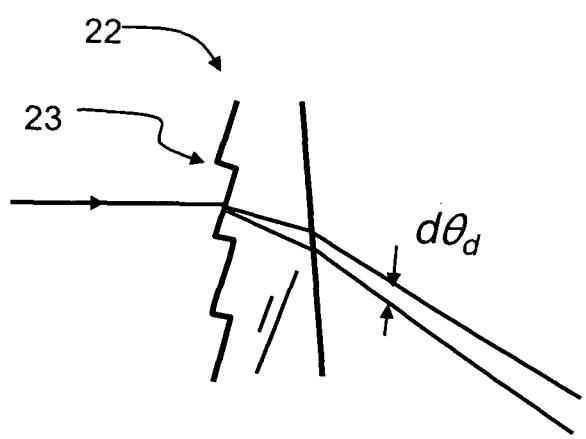
FIG. 19B is a close-up view of a portion of a single lens element having a diffractive feature and showing the diffractive chromatic deviation angle.

The equation that describes the achromatization provided by diffractive feature 23 is given by:

$$\frac{d\theta_c}{d\lambda} + \frac{d\theta_d}{d\lambda} = 0$$

where $\theta_c$ is the refractive deviation angle (FIG. 19A), $\theta_d$ is the diffractive deviation angle (FIG. 19B), and λ is the imaging wavelength. The change in the refractive deviation angle can be expressed as:

$$\frac{d\theta_c}{d\lambda} = -\frac{1}{(n-1)} \cdot \frac{x}{f} \cdot \frac{dn}{d\lambda} \text{ for } \frac{d\theta_d}{d\lambda} = \frac{k}{p}$$

where n is the refractive index of the lens material at the central imaging wavelength $\lambda_0$, f is the focal length of the lens, k is the selected diffraction order (usually k=1), and p is the local step of the diffraction grating.

The achromatization equation thus becomes:

$$\frac{1}{p} = \frac{x}{k \cdot (n-1) \cdot f} \cdot \frac{dn}{d\lambda}$$

The integration of this expression from the optical axis along the radius in the x-direction yields the diffractive layer thickness as (where "INT"="integer"):

$$e(x) = INT\left(\frac{x^2}{2 \cdot (n-1) \cdot f} \cdot \frac{dn}{d\lambda}\right) \cdot \frac{\lambda_0}{(n-1)}$$

Figure 20:
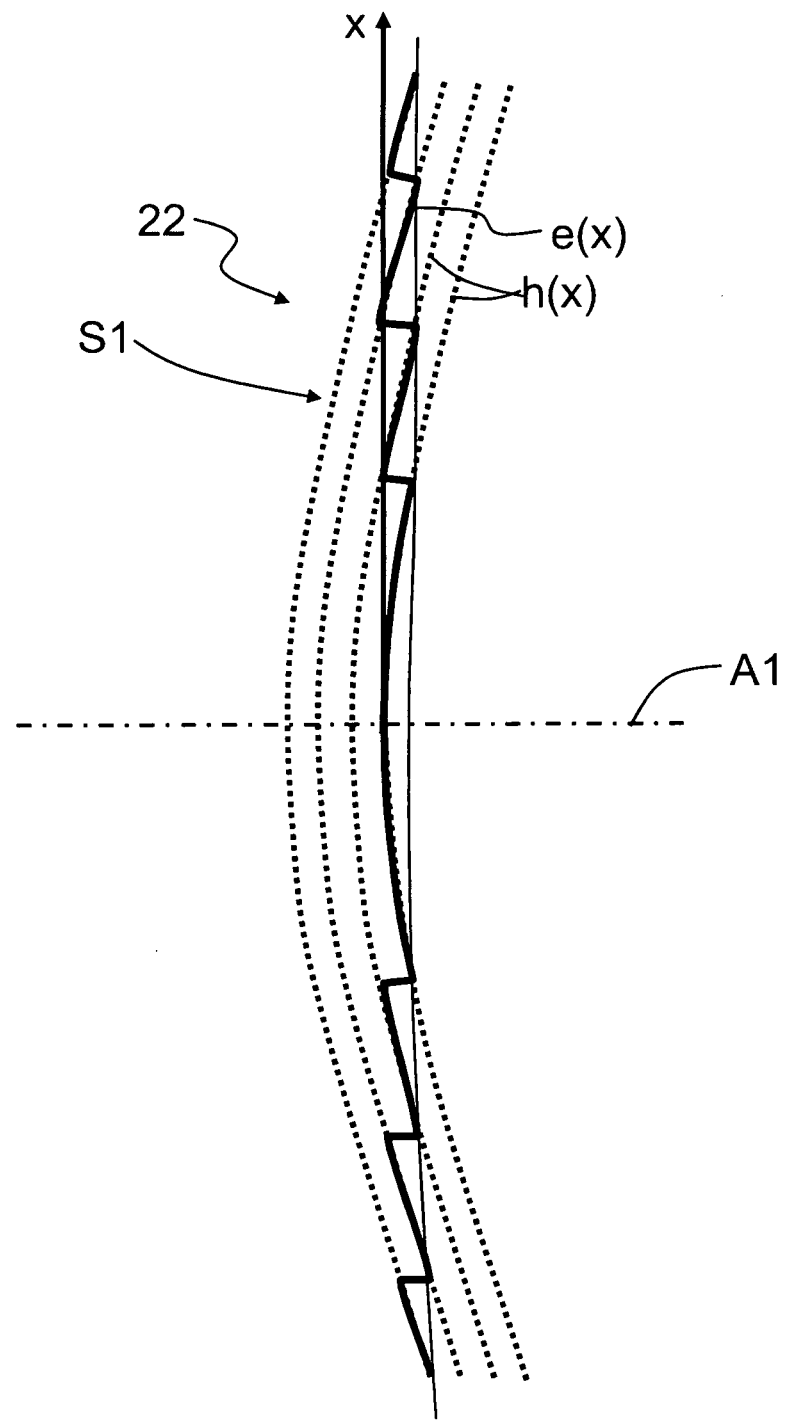
FIG. 20 is a close-up view of an objectwise lens surface of a single lens element having a Fresnel-like diffractive feature designed to reduce chromatic aberration.

This form for diffractive feature 23 is shown in the close-up view of FIG. 20, and gives rise to a modified lens 22 of Table T10, as set forth in Table T11 below.

TABLE T11

Lens Element with Diffractive Feature

| | |
|---|---|
| Effective focal length | 20 mm |
| Aperture | F/4 |
| Image field diameter | 6 mm |
| Object field size | 16° |

Figure 21A:
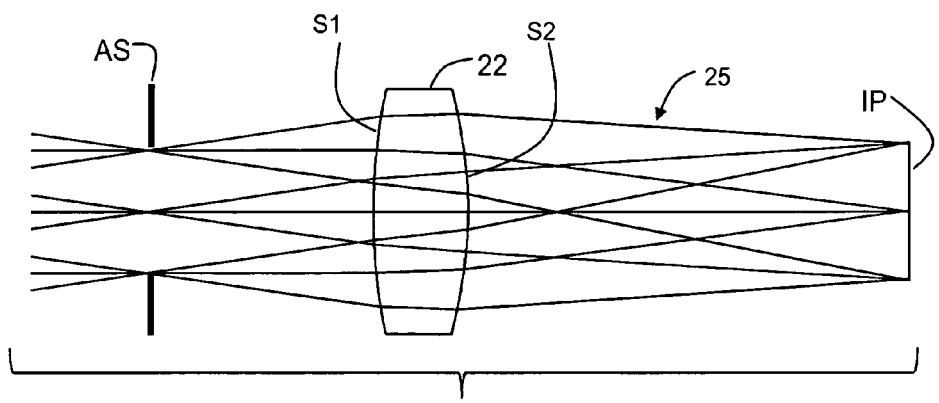
FIG. 21A is a ray-trace plot of a single lens element having an objectwise diffractive feature (not shown) and aspherical surfaces.

FIG. 21A shows an example optical system 20 with rays 25 traced from the object (not shown) to the image plane IP. Lens element 22 includes a diffractive feature 23 (not shown) on objectwise surface S1 and an aspheric surface S2, as set forth in Table T12, below. In Table T12, the parameter Z defines the aspheric surface coordinate (and thus the aspheric surface shape), r is the radial coordinate, k is the conic constant, and c is the inverse of the radius of curvature. The diffractive layer that makes up diffractive feature 23 is defined separately and is added to the existing lens surface.

TABLE T12

Design Parameters for Lens element with Diffractive Feature

| | |
|---|---|
| Curvature of surface S1: | $Z = \dfrac{cr^2}{1+\sqrt{1-(1+k)c^2r^2}}$ <br> c = 0.04067 mm-1 <br> k = 7.6 (ellipse) |
| Curvature of surface S2: | $Z = \dfrac{cr^2}{1+\sqrt{1-(1+k)c^2r^2}}$ <br> C = 0.0579 <br> k = −5.63 (hyperbola) |
| Center thickness | 4 mm |
| Aperture diameter | 10 mm |
| Material | PMMA or Acrylic |
| Object field size | 16° |

Figure 21B:
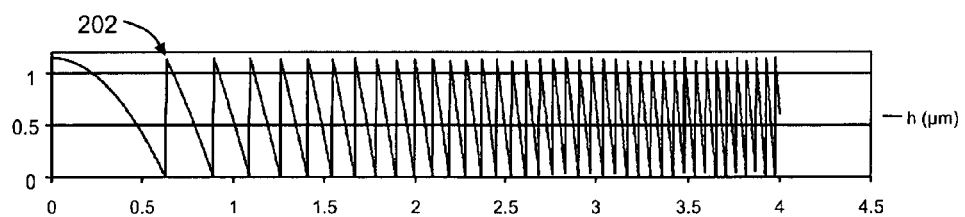
FIG. 21B is the plot of the thickness of optical material that forms the diffractive feature formed by the configuration of FIG. 21C and that corrects chromatic aberration by using the first diffraction order.
Figure 21C:
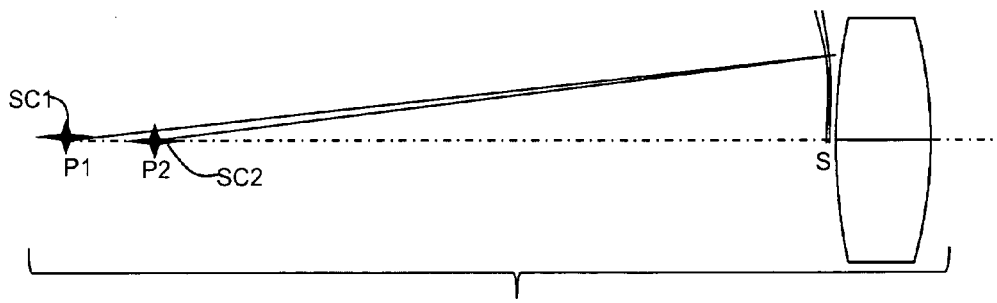
FIG. 21C shows virtual coherent source points P1 and P2 that produce Newton's fringe pattern and define the rings for the diffractive feature on the objectwise lens surface of the single lens element of FIG. 21A.

Best performance across the image field is achieved with two optimized aspheric surfaces S1 and S2. However, acceptable performance can be achieved by using only one aspheric surface. Aspheric surfaces can be developed as a conic section (hyperbolic, parabolic, elliptical, etc.,) or by a more general aspheric surface defined using a polynomial expansion The added diffractive feature 23 on surface S1 (or on surface S2) provides achromatisation by reducing the primary axial chromatic aberration. It also reduces the primary lateral color because the diffractive surface is on the refractive component and is separated from aperture stop AS. An example shape of diffractive feature 23 is plotted in FIG. 21B. There are about 40 concentric rings 202 separated by steps of 1.1 μm depth that produces a 2π phase change at the central imaging wavelength $\lambda_0$=550 nm. With reference to FIG. 21C, the radius of the rings 202 can be defined by the radius of the Newton rings (fringes) produced by two coherent sources SC1 and SC2 located at axial positions P1 and P2 respectively at 53 mm and 46 mm from lens surface S1.

Field Curvature Considerations

Figure 22A:
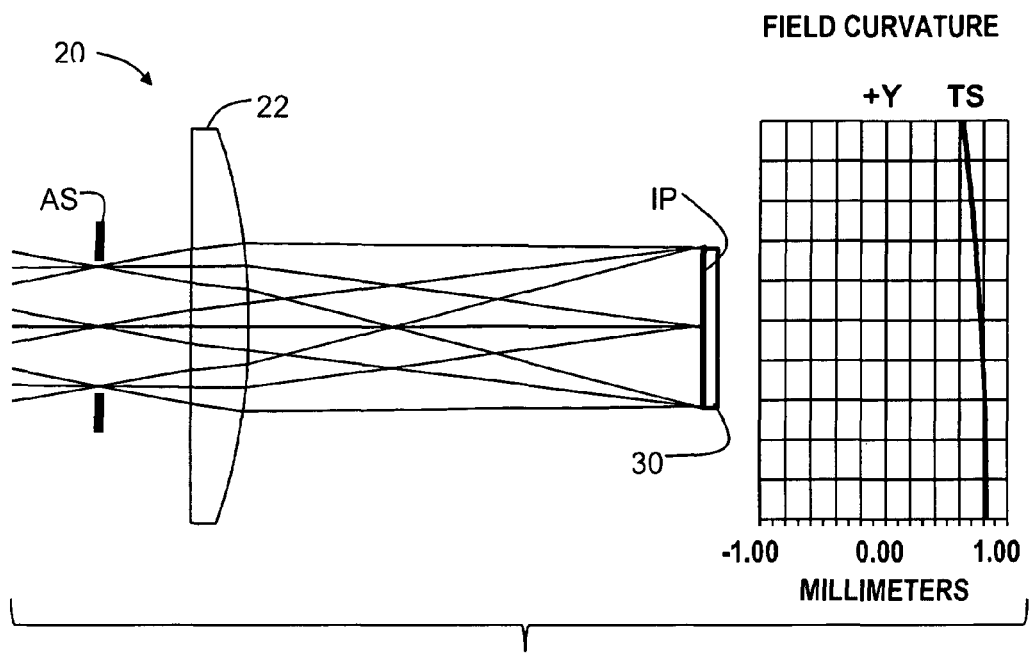
FIG. 22A is a schematic diagram of a single-lens imaging optical system and a corresponding plot of the field curvature.

In some example optical systems 20, the available image field is limited by field curvature. Because field curvature is proportional to the lens power, it cannot be corrected when only a single lens element 22 is used to constitute optical system 20. FIG. 22A is a schematic diagram of the single-lens imaging optical system 20 along with a corresponding plot of the field curvature. The plot of FIG. 22A shows a 0.2 mm change in the best focus position as a function of field height h. This change in focus position with field height reduces the EDOF effect.

Figure 22B:
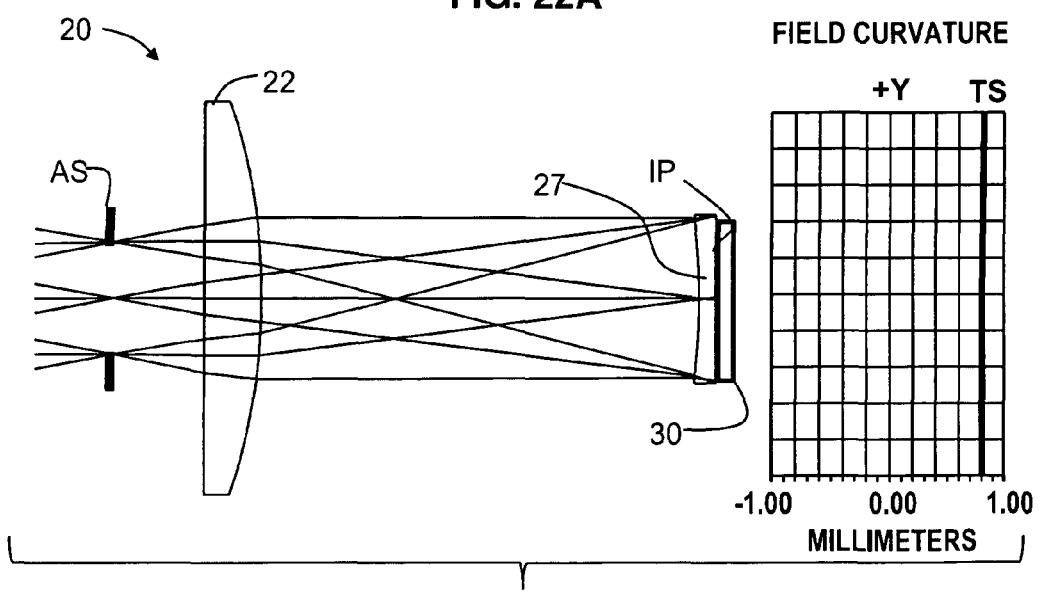
FIG. 22B is a schematic diagram of the single-lens imaging optical system that includes a field lens immediately adjacent the image sensor (not shown), and a corresponding plot of the field curvature showing a substantially flat field at the image sensor.

FIG. 22B is similar to FIG. 22A and illustrates an example embodiment that includes a field lens 27 immediately adjacent sensor 30. Field lens 27 is a negative lens that acts as a "field flattener." Field lens 27 can be considered as part of an assembly formed with image sensor 30 since the field lens only affects field curvature at the image sensor. Thus, in an example embodiment, field lens 27 is contacted to image sensor 30, and the field lens and image sensor form an image sensor assembly. The plot of FIG. 22B shows a substantially flat field due to the presence of field lens 27. The resultant flat field serves to optimize the EDOF effect.

Advantages

The single-element lens design of optical system 20 of EDOF system 10 has a number of key advantages over prior art EDOF imaging systems. The first is that the design is simple and only uses one optical element to achieve the desired EDOF effect. The second is that the optical element is a standard rotationally symmetric singlet lens, as opposed to a more complicated phase plate. The third advantage is that configuring the optical system to have select amounts of spherical aberration gives rise to an axial "zero coma" position for the aperture stop so that comatic aberration can be substantially eliminated, with the result that the only significant aberration is spherical aberration uniform over the image field—which is what is required for the EDOF imaging. The fourth advantage is the low cost associated with a single-lens optical system—an advantage that cannot be overstated given that many applications of system 10 will be for compact, hand-held devices such as cell phones and the like that need to maintain their cost competitiveness.

It will thus be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An imaging system for imaging an object within an extended depth-of-field (EDOF) at an imaging wavelength λ and with an average modulation transfer function (MTF), comprising:
   an optical system having an optical axis and consisting of a single lens element and an aperture stop arranged objectwise of the single lens element, the optical system having an amount of spherical aberration SA such that 0.2λ≦SA≦5λ when forming an image of the object, the single lens element being made of a glass or plastic material that generates an amount of axial chromatic aberration that increases the EDOF up to 20% while decreasing the average MTF of the optical system by no more than 25%, relative to the optical system having no chromatic aberration, the aperture stop being located at an axial position that substantially minimizes comatic aberration; and
   an image sensor arranged to receive the raw image and form therefrom a digitized electronic raw image.

2. The system of claim 1, further comprising: an image processor electrically connected to the image sensor and adapted to receive the digitized electronic raw image digitally filtered to form a digitized contrast-enhanced image.

3. The system of claim 1, wherein 0.5λ≦SA≦1λ.

4. The system of claim 1, wherein the single lens element includes at least one diffractive feature configured to reduce chromatic aberration.

5. The system of claim 1, wherein the single lens element has first and second surfaces, at least one of the first and second surfaces is aspheric.

6. The system of claim 1, wherein the optical system has an F/# such that $F/1.4 \leqq F/\# \leqq F/15$.

7. The system of claim 1, further comprising: a field lens arranged immediately adjacent the image sensor and configured to reduce an amount of field curvature imparted by the single lens element.

8. The system of claim 1, wherein the single lens element is selected from the group of lens elements comprising: a bi-convex lens element, a positive meniscus lens element arranged so as to have concave surfaces relative to the object, and a piano-convex lens element arranged to have an object-wise planar surface.

9. A method of forming an image of an object over an extended depth of field (EDOF) at an imaging wavelength $\lambda$, comprising:

forming a raw image of an object with an optical system consisting of a single lens element and an aperture stop arranged objectwise of the single lens element, the optical system having an amount of spherical aberration SA such that $0.2\lambda \leqq SA \leqq 5\lambda$;

wherein the single lens element is made of a glass or plastic material, and the glass material being selected to generate an amount of chromatic aberration that increases the EDOF by no more than 20% while decreasing the average MTF by no more than 25%, relative to the optical system having no chromatic aberration, the aperture stop being located at an axial position that substantially minimizes comatic aberration; and using an image sensor, electronically capturing the raw image to form a digitized raw image.

10. The method of claim 9, wherein $0.5\lambda \leqq SA \leqq 1\lambda$.

11. The method of claim 9, further comprising: digitally filtering the digitized raw image to form a contrast-enhanced image.

12. The method of claim 11, wherein the raw image has associated therewith a raw modulation transfer function (MTF), and further comprising:

establishing an amount of defocus in the digitized raw image based on a position of the object relative to the optical system;

forming an enhanced MTF from the raw MTF by multiplying the raw MTF by a gain function, wherein the enhanced MTF is a function of the amount of defocus; and applying the enhanced MTF to the digitized raw image to obtain the contrast-enhanced image.

13. The method of claim 12, including:

measuring a distance between the object and the optical system; and forming the enhanced MTF by applying a two-dimensional linear digital filter to the raw MTF according to the measured distance.

14. The method of claim 13, including measuring the raw MTF at different distances that overlap the depth of field DOF by using a slanted edge with uniform incoherent backlighting.

15. The method of claim 11, wherein the raw image has an associated raw MTF, and further comprising:

forming an enhanced MTF from the raw MTF by multiplying the raw MTF by a gain function, wherein the enhanced MTF is substantially constant as a function of focus position; and applying the enhanced MTF to the digitized raw image to obtain the contrast-enhanced image of the object.

16. The method of claim 9, including providing at least one diffraction feature on one or more surfaces of the single lens element so as to reduce chromatic aberration.

17. The method of claim 9, including providing at least one aspheric surface to the single lens element.

18. The system of claim 1, wherein the aperture stop is located relative to the single lens element at or near a zero-coma position.

19. The method of claim 9, wherein the aperture stop is located relative to the single lens element at or near a zero-coma position.

* * * * *